(12) United States Patent
Hirabayashi

(10) Patent No.: US 7,847,467 B2
(45) Date of Patent: Dec. 7, 2010

(54) AUTOMOTIVE ENGINE STARTER AND ELECTRIC ROTARY MACHINE DESIGNED TO WITHSTAND VIBRATIONAL IMPACT

(75) Inventor: Takashi Hirabayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/585,290

(22) Filed: Sep. 10, 2009

(65) Prior Publication Data

US 2010/0001613 A1 Jan. 7, 2010

Related U.S. Application Data

(62) Division of application No. 11/442,171, filed on May 30, 2006, now Pat. No. 7,608,956.

(30) Foreign Application Priority Data

| May 30, 2005 | (JP) | ............................ 2005-157330 |
| Jun. 17, 2005 | (JP) | ............................ 2005-177203 |
| Jun. 24, 2005 | (JP) | ............................ 2005-185118 |

(51) Int. Cl.
*H01R 39/04* (2006.01)
(52) U.S. Cl. ...................................... 310/233; 310/235
(58) Field of Classification Search .................. 310/233, 310/90, 235–237
See application file for complete search history.

(56) References Cited

U.S. PATENT DOCUMENTS 3,430,084 A 2/1969 Hall et al.

| 4,119,875 A | 10/1978 | Noguchi et al. |
| 4,406,963 A | 9/1983 | Wolf et al. |
| 5,424,599 A | 6/1995 | Stroud |
| 5,434,463 A | 7/1995 | Horski |
| 5,610,466 A | 3/1997 | Shiga et al. |
| 6,066,907 A * | 5/2000 | Matsushima et al. ......... 310/239 |
| 6,563,245 B1 | 5/2003 | Suzuki et al. |

(Continued)

FOREIGN PATENT DOCUMENTS

JP A-62-118732 5/1987

(Continued)

OTHER PUBLICATIONS

Notification of Reasons for Rejection for JP-2005-177203, with English translation, May 19, 2009, p. 1-3, Japan.

(Continued)

*Primary Examiner*—Quyen Leung
*Assistant Examiner*—Naishadh N Desai
(74) *Attorney, Agent, or Firm*—Oliff & Berridge, PLC

(57) ABSTRACT

An electric rotary machine which may be employed as a dc motor in an automotive engine starter. The motor includes an armature equipped with an armature shaft, a commutator, brushes, and a bearing retaining an end of the armature shaft. The surface of the commutator has a plurality of protrusions extending in parallel to each other in a direction of rotation of the commutator. Each of the brushes has formed in the bottom thereof grooves in which the protrusions of the commutator are fit. The brushes are urged into constant engagement of the grooves with the protrusions on the commutator to establish electrical contacts between the brushes and the commutator and minimize movement of the armature shaft relative to the bearing.

8 Claims, 16 Drawing Sheets

U.S. PATENT DOCUMENTS

| | | |
|---|---|---|
| 6,768,241 B2 * | 7/2004 | Kamei et al. ............... 310/207 |
| 6,861,781 B2 | 3/2005 | Niimi et al. |
| 6,876,113 B1 | 4/2005 | Harris |
| 6,979,922 B2 | 12/2005 | Simofi-Ilyes et al. |
| 7,196,440 B2 | 3/2007 | Lamprecht |
| 2003/0117035 A1 | 6/2003 | Gerstenberger |
| 2003/0127941 A1 * | 7/2003 | Otani et al. ............... 310/252 |
| 2004/0140729 A1 * | 7/2004 | Niimi .................... 310/233 |
| 2005/0269886 A1 | 12/2005 | Harris |
| 2005/0285459 A1 | 12/2005 | Ishida et al. |

FOREIGN PATENT DOCUMENTS

| | | |
|---|---|---|
| JP | A-62-283217 | 12/1987 |
| JP | A-04-046546 | 2/1992 |
| JP | A-5-106538 | 4/1993 |
| JP | A-7-123628 | 5/1995 |
| JP | A-8-114164 | 5/1996 |
| JP | A-10-191607 | 7/1998 |
| JP | A-10-196495 | 7/1998 |
| JP | B2-3125944 | 11/2000 |
| JP | A-2001-136710 | 5/2001 |
| JP | A-2002-080922 | 3/2002 |
| JP | A-2004-229352 | 8/2004 |

OTHER PUBLICATIONS

Office Action from U.S. Appl. No. 12/585,292; mailed Jun. 25, 2010.

Mar. 23, 2010 Office Action issued in Japanese Patent Application No. 2005-185118 (with translation).

Notification of Reasons for Rejection for Japanese Application No. 2005-157330; mailed Jun. 22, 2010 (with translation).

* cited by examiner $Fb = Fs \times \sin \theta$
$Fa = Fb \times \cos \theta$
$\phantom{Fa} = Fs \times \sin \theta \times \cos \theta$

AUTOMOTIVE ENGINE STARTER AND ELECTRIC ROTARY MACHINE DESIGNED TO WITHSTAND VIBRATIONAL IMPACT

CROSS REFERENCE TO RELATED DOCUMENT

This is a Division of application Ser. No. 11/442,171 filed May 30, 2006, which claims the benefit of Japanese Patent Application No. 2005-157330 filed on May 30, 2005, Japanese Patent Application No. 2005-177203 filed on Jun. 17, 2005, and Japanese Patent Application No. 2005-185118 filed on Jun. 24, 2005. The disclosures of the prior applications are hereby incorporated by reference herein in their entirety.

BACKGROUND OF THE INVENTION

1. Technical Field of the Invention

The present invention relates generally to a starter for automotive engines and an electric rotary machine designed to have an improved structure to withstand vibrational impacts.

2. Background Art

Japanese Patent Publication No. 3125944 discloses a starter equipped with an output shaft to which torque of a motor is transmitted through a speed reducer, a clutch joined to an outer periphery of the output shaft through helical splines, and a pinion gear fitted on the output shaft integrally with the clutch. When it is required to start an engine, the pinion gear is shifted away from the motor together with the clutch into mesh with a ring gear of the engine to output the torque, as transmitted from the clutch, to the ring gear to crank the engine.

The motor has an armature shaft which is retained by a sleeve bearing and not held from moving in an axial direction thereof. Therefore, when subjected to pulsations of torque produced by the engine being cranked, the armature rotates while vibrating in the axial direction. In order to avoid such a problem, as illustrated in FIG. 19, the armature shaft 410 of the starter has the small-diameter end 420 fitted in the sleeve bearing 400 in abutment of the shoulder 430 with the end of the sleeve bearing 400 to hold the armature shaft 410 from moving in the rightward direction, as viewed in the drawing. A thrust load acts between the shoulder 430 of the armature shaft 410 and the end of the bearing 400. An increase in pressure exerted on surfaces of the shoulder 430 and the end of the bearing 400 will result in wear or seizing thereof. In order to alleviate this problem, the flange 440 which extends radially and outwardly is formed on the end of the bearing 400 to increase an area of the bearing 400 which is in contact with the shoulder 430 of the armature shaft 410 for decreasing the pressure per unit area acting on the shoulder 430 and the bearing 400.

The increase in area of contact between the shoulder 430 and the end of the bearing 400 may also be achieved by 1) increasing diameter of the end 420 of the armature shaft 410 to increase the size of the bearing 400 or 2) decreasing the diameter of the end 420 while increasing the thickness of the bearing 400. The wear or seizing of the surfaces of the shoulder 430 and the end of the bearing 400 may be avoided by installing a washer therebetween to decrease speeds of the shoulder 430 and the bearing 400 relative to the washer.

The bearing 400 with the flange 440 is usually required to be machined in a special manner, thus resulting in an increase in manufacturing cost of the starter. Additionally, the thrust load usually concentrates on the flange 440, thus increasing ease of breakage of the flange 440.

The increase in diameter of the end 420 of the armature shaft 410 to increase the size of the bearing 400 requires an undesirable increase in diameter of the armature shaft 410 to secure a desired area of the shoulder 430, thus resulting in an increased entire weight of the armature. This is a very serious problem for modern starters required to be lightweight. The increased size of the bearing 400 requires a change in design of a frame retaining the bearing 400, which leads to an increase in total production cost of the starter.

The decrease in diameter of the end 420 of the armature shaft 410 to increase the thickness of the bearing 400 may result in a lack of mechanical strength of the end 420. This method is, therefore, unuseful. Additionally, an increase in thrust load acting on the bearing 400 will result in a loss of torque of the armature shaft 410, thus decreasing the output of the starter. It is, thus, essential to decrease the thrust load acting on the armature shaft 410.

SUMMARY OF THE INVENTION

It is therefore a principal object of the invention to avoid the disadvantages of the prior art.

It is another object of the invention to provide a starter or an electric rotary machine designed to have the structure to control or withstand to axial vibrations of an armature shaft.

According to one aspect of the invention, there is provided a starter which may be employed in starting an internal combustion engine. The starter comprises: (a) an electric motor including an armature, a commutator, and brushes, the armature being equipped with an armature shaft working to produce torque for starting an engine, the commutator being retained on the armature shaft to have a cylindrical commutator surface rotatable in a direction of rotation of the armature shaft, the brushes slidably riding on the commutator surface in electrical contact therewith; (b) an oil-impregnated bearing which retains an end of the armature shaft to be rotatable; (c) a plurality of protrusions extending on the commutator surface substantially in parallel to each other in a direction of rotation of the commutator surface; and (d) urging mechanisms each of which works to urge a surface of one of the brushes into constant engagement with the protrusions to establish the electrical contacts between the brushes and the commutator surface and minimize movement of the armature shaft relative to the bearing.

Specifically, the protrusions serve to establish tight fitting of the commutator surface to the surface of each of the brushes during sliding of the brushes on the commutator surface, thus minimizing vibrational movement of the armature shaft in an axial direction thereof. This results in a decrease in thrust load acting on the bearing, thereby eliminating the need for a flange on an end of the bearing and decreasing production costs of the starter.

The engagement of the protrusions with the surface of each of the brushes results in an increase in area of physical contact between the brushes and the commutator surface, thereby ensuring the stability of the electrical contacts between the brushes and the commutator surface.

In the preferred mode of the invention, the starter further comprises a speed reducer working to reduce in speed of rotation of the armature shaft.

The speed reducer may be implemented by a planetary gear speed reducer which includes a sun gear formed on an end of the armature shaft opposed to the end retained by the bearing and planet gears placed in mesh with the sun gear. The planet gears revolves around the sun gear following rotation of the armature shaft while rotating.

The starter further comprises an output shaft placed in alignment with the armature shaft, a clutch joined to an outer periphery of the output shaft through helical splines, and a pinion gear which is fitted on the output shaft and brought into mesh with the engine to output torque of the output shaft transmitted to the pinion gear through the clutch when it is required to start the engine. The pinion gear is formed integrally with the clutch. The planetary gear speed reducer disposed between the output shaft and the armature shaft to reduce a speed of rotation of the armature shaft and transmit the reduced speed to the output shaft.

The end of the armature shaft retained by the oil-impregnated bearing may be smaller in diameter than a major portion of the armature shaft on which an armature core is fitted to define a shoulder between the end and the major portion. The shoulder is placed in abutment with an end of the bearing to receive a thrust load acting on the armature.

The protrusions extending on the commutator surface may be ridges of substantially V-shape in cross section.

According to the second aspect of the invention, there is provided an electric rotary machine which comprises: (a) an armature working to produce torque; (b) a commutator disposed on the armature, the commutator having a commutator surface; (c) brushes riding on the commutator surface in electrical contact therewith, the brushes sliding on the commutator surface during rotation of the armature; (d) a plurality of protrusions extending on the commutator surface in a circumferential direction of the commutator surface in which the brushes slide on the commutator surface, the protrusions being arrayed substantially in a widthwise direction of the commutator surface perpendicular to the circumferential direction; (e) urging mechanisms each of which works to urge a surface of one of the brushes into constant engagement with the protrusions to establish the electrical contacts between the brushes and the commutator surface; and (f) a flat area formed on at least one of end portions of the commutator surface which are opposed to each other in the widthwise direction. The flat area is unoccupied by the protrusions. The formation of the flat area avoids the breakage of an edges of the commutator surface and increases ease of machining the protrusions.

In the preferred mode of the invention, a range in which the protrusions are arrayed in the widthwise direction of the commutator surface is smaller than a width of each of the brushes, as defined in the widthwise direction of the commutator surface.

The electric rotary machine further comprises a flat area formed on the other of the end portions of the commutator surface. The flat area is unoccupied by the protrusions. A range in which the protrusions are arrayed lies within a range, where the brushes slide on the commutator surface, in the widthwise direction of the commutator surface.

The commutator is disposed around a circumference of an armature shaft in the form of a cylinder whose peripheral surface serves as the commutator surface.

The end portions of the commutator surface are opposed to each other in an axial direction of the commutator. The other of the end portions of the commutator surface has a joint between the commutator and an armature coil.

The commutator surface expands in a radius direction of an armature shaft of the commutator.

The end portions of the commutator surface are opposed to each other in the radius direction of the armature shaft of the commutator.

Each of the brushes has a bending strength of 16 MPa or more, as determined based on a bending strength of a test piece calculated according to an equation of $8 \times P \times L/(2 \times A \times B^2)$ where L is a distance (cm) between supports on which the test piece is placed, A is a width (cm) of the test piece, B is a thickness (cm) of the test piece, and P is a maximum load (N) when the test piece is broken.

Each of the brushes may be made up of a stack of layers. In this case, the bending strength of the brush is an average of bending strengths of the layers.

The electric rotary machine may be designed to start an internal combustion engine.

According to the third aspect of the invention, there is provided an electric rotary machine which comprises: (a) a casing including an end frame; (b) an armature equipped with an armature shaft to produce torque, the armature shaft being retained at an end thereof by the end frame to be rotatable through a bearing; (c) a commutator disposed on the armature, the commutator having a cylindrical commutator surface over the armature shaft at a side of the end retained by the end frame; (d) brushes riding on the commutator surface in electrical contact therewith, the brushes sliding on the commutator surface during rotation of the commutator; (e) a holder plate secured to the casing; (f) brush holders each of which retains one of the brushes, the brushes being secured to the holder plate; (g) a plurality of protrusions extending on the commutator surface in a circumferential direction of the commutator surface in which the brushes slide on the commutator surface, the protrusions being arrayed substantially in an axial direction of the commutator surface perpendicular to the circumferential direction; (h) urging mechanisms each of which works to urge a surface of one of the brushes into constant engagement with the protrusions to establish the electrical contacts between the brushes and the commutator surface; and (i) a stopper mechanism provided at the side of the end of the armature shaft retained by the end frame. The stopper mechanism works to stop the armature from moving relative to the end frame in an axial direction of the armature.

In the preferred mode of the invention, the holder plate has surfaces which are opposed to each other in a thickness-wise direction thereof and which extend perpendicular to the armature shaft. The holder plate is in abutment of one of the surfaces with an end wall of the end frame oriented in the axial direction of the armature. Each of the brush holders has a holder wall facing one of opposed surfaces of a corresponding one of the brushes in the axial direction of the armature. The one of the opposed surfaces is farther from the end frame in the axial direction of the armature than the other. The holder wall is so located as to be kept away from the brush through a gap when the armature is at a position farthest from the end frame within a range where the armature is allowed to move by the stopper mechanism.

Each of the brush holders has a chamber within which a corresponding one of the brushes is retained and which is defied by a first wall and a second wall opposed to the first wall in the axial direction of the armature. The first wall faces one of opposed surfaces of the brush so as to be kept away therefrom through a first gap when the armature is at a position farthest from the end frame within a range where the armature is allowed to move by the stopper mechanism. The second wall faces the other of the opposed surfaces of the brush so as to be kept away therefrom through a second gap when the armature is at a position closest to the end frame within the range.

The holder plate has an outer periphery nipped between a yoke and the end frame and extends perpendicular to a length of the armature shaft. Each of the brush holders is located closer to the end frame than the holder plate.

The end of the armature shaft retained by the bearing is smaller in diameter than a major portion of the armature shaft to define a shoulder between the end and the major portion. The shoulder serves to limit movement of the armature toward the end frame. The end of the armature has a tip extending through and outside the end frame. The tip is held by a stopper member so that movement of the tip inside the end frame is limited. The shoulder and the stopper member constitute the stopper mechanism.

The bearing retaining the end of the armature shaft may be implemented by a ball bearing serving as the stopper mechanism. The ball bearing includes an inner ring fitted on an outer periphery of the end of the armature shaft and an outer ring fitted in a bearing mount chamber formed in the end frame to limit axial movement of the armature.

The electric rotary machine may be designed to start an internal combustion engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
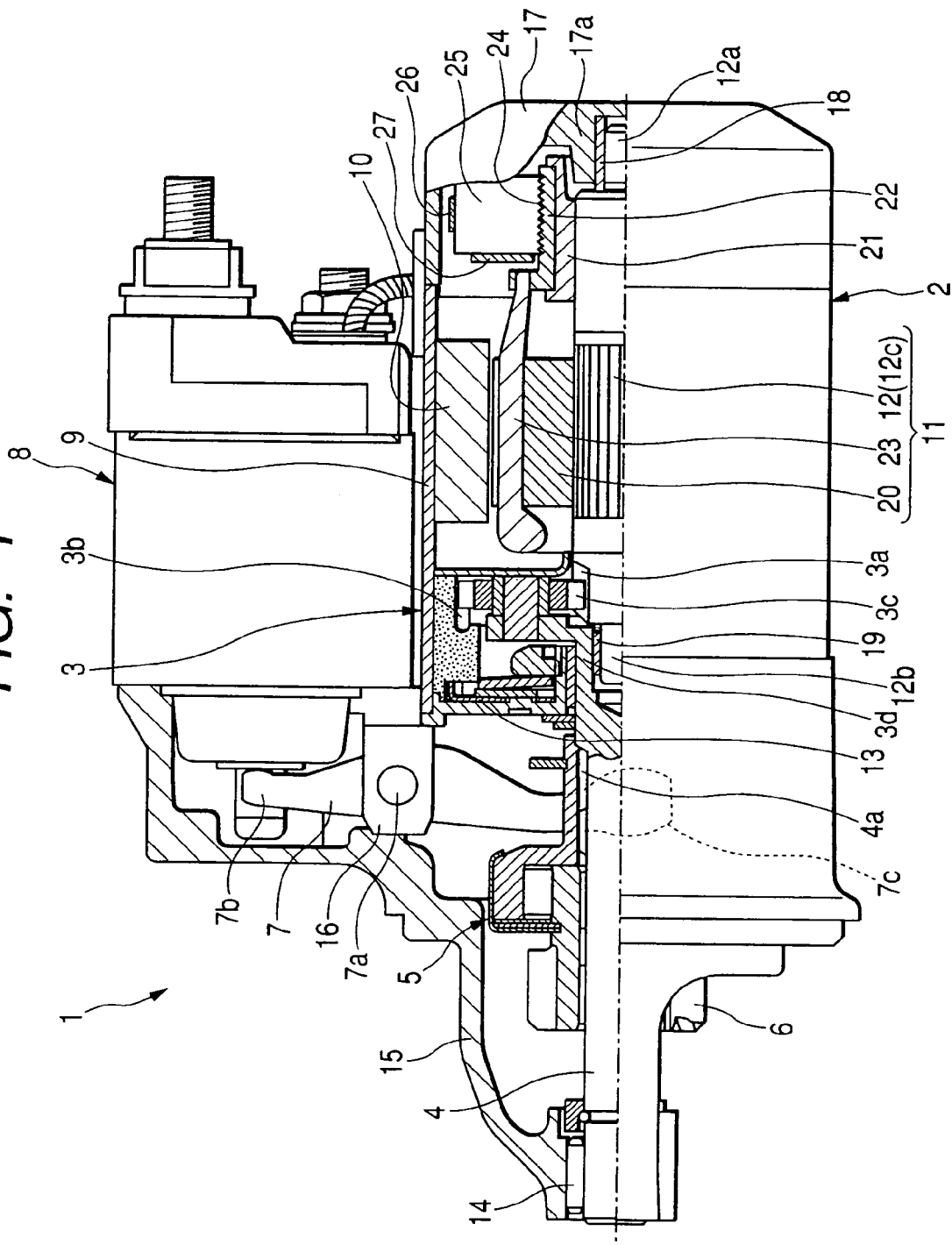
FIG. 1 is a partially sectional view which shows a starter according to the first embodiment of the invention.

Referring to the drawings, wherein like reference numbers refer to like parts in several views, particularly to FIG. 1, there is shown an automotive engine starter 1 according to the first embodiment of the invention.

The starter 1 consists essentially of a rotary electric machine designed as an electrical motor 2, a speed reducer 3, an output shaft 4, a clutch 5, a pinion gear 6, and a solenoid switch 8. The pinion gear 6 is formed integrally with the clutch 5 and fitted on the output shaft 4. The output shaft 4 is coupled with the motor 2 through the speed reducer 3. When energized, the solenoid switch 8 works to move the clutch 5 and the pinion 6 away from the motor 2 (i.e., leftward as viewed in the drawing) through a shift lever 7 and also close main contacts (not shown) connected to a motor power circuit called main circuit to energize the motor 2. When energized, the motor 2 works to produce torque which is, in turn, transmitted to the output shaft 4 through the speed reducer 3.

The motor 2 is a typical dc motor which includes an armature 11 and a field system made up of a yoke 9 and permanent magnets 10 disposed around an inner circumference of the yoke 9. The armature 11 is disposed to be rotatable inside the field system and works to produce torque when subjected to electromagnetic force, as developed by the field system. The permanent magnets 10 may be replaced with field coils.

The speed reducer 3 is implemented by a typical epicycle reduction gear train (also called a planetary gear speed reducer) and made up of a sun gear 3a, an internal gear 3b, and planet gears 3c. The sun gear 3a is formed on the end of an armature shaft 12 of the motor 2. The internal gear 3b is limited in speed by a torque limiter, as will be described later. The planet gears 3c are placed in mesh with the gears 3a and 3b.

The torque limiter has a rotary disc 13 retained frictionally. The rotary disc 13 is coupled with the internal gear 3b. In operation, addition of excessive torque to the internal gear 3b which is greater than holding torque thereof will cause the rotary disc 13 of the torque limiter to slip against the friction, thereby permitting the internal gear 3b to rotate to absorb the excessive torque.

The output shaft 4 is arranged coaxially in alignment with the armature shaft 12 and connected at an end thereof to the armature shaft 12 through an output shaft 3d of the speed reducer 3 and at the other end to the front housing 15 through the bearing 14 to be rotatable.

The clutch 5 is made of a one-way clutch (also called overrunning clutch) and disposed in engagement with a helical spline 4a formed on the output shaft 4 to be movable along the output shaft 4. When it is required to start the engine, the clutch 5 works to transmit the torque of the output shaft 4 to the pinion gear 6. When the pinion gear 6 is rotated by the engine, so that the speed of the pinion gear 6 exceeds that of the output shaft 4, the clutch 5 works to block the transmission of the torque from the pinion gear 6 to the output shaft 4.

The pinion gear 6 is constructed integrally with the clutch 5. When it is required to start the engine, the pinion gear 6 is moved away from the motor 2 along with the output shaft 4 into mesh with a ring gear (not shown) joined to the engine and then transmits the torque from the clutch 5 to the ring gear to crank the engine.

The solenoid switch 8 includes an excitation coil (not shown) to be excited by the power supplied from a storage battery installed in the vehicle upon closing of a starter switch (not shown) by a vehicle operator and a plunger (not shown) movable inside the excitation coil. When the excitation coil is energized by closing of the starter switch, it will produce magnetic attraction to pull the plunger to close the main contacts of the main circuit of the motor 2. Alternatively, when the excitation coil is deenergized, the magnetic attraction disappears, so that the plunger is moved backward by a return spring (not shown) to open the main contacts.

The shift lever 7 is retained by a lever holder 16 to be swingable to transmit longitudinal movement (i.e., lateral movement, as viewed in FIG. 1) of the plunger to the clutch 5. Specifically, the shift lever 7 has a support shaft 7a retained by the lever holder 16 to be rotatable. The shift lever 7 also has ends 7b and 7c opposed across the support shaft 7a. The end 7b is coupled with the plunger of the solenoid switch 8. The end 7c is coupled with the clutch 5 to transmit the movement of the plunger to the clutch 5. In operation, when the plunger is moved rightward, as viewed in the drawing, by the magnetic attraction, as produced by the solenoid switch 8, it will cause the end 7b of the shift lever 7 to be pulled by the plunger, thereby swinging the end 7c around the support shaft 7a to push the clutch 5 away from the motor 2.

The structural feature of the starter 1 will be described below.

Figure 2A:
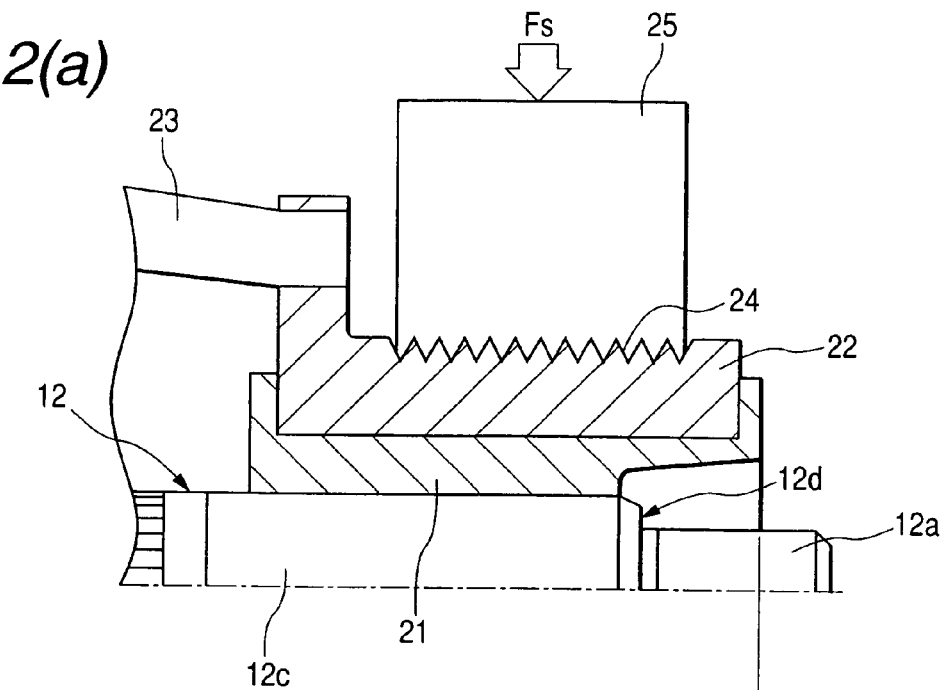
FIG. 2(a) is a partial sectional view which shows engagement of a brush with a commutator surface in the starter of FIG. 1.
Figure 2B:
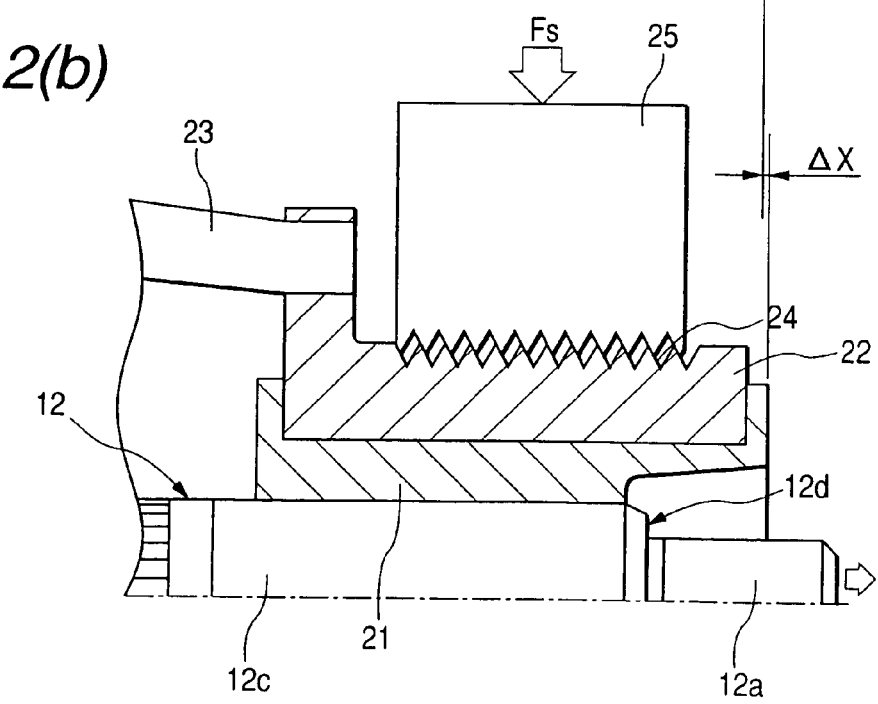
FIG. 2(b) is a partial sectional view which shows displacement of a commutator surface relative to a brush due to vibrational movement of an armature shaft in the starter of FIG. 1.

The armature shaft 12 of the motor 2 has ends 12a and 12b. The end 12a is retained to be rotatable by a bearing 18 fitted in a bearing mount 17a of an end frame 17. The end 12b is retained by a bearing 19 to be rotatable relative to the output shaft 3d of the speed reducer 3. The armature shaft 12 consists of a major body 12c on which an armature core 20 is fitted through serrations. The major body 12c is greater in diameter than the end portions 12a and 12b to form shoulders 12d (one is illustrated in FIGS. 2(a) and 2(b)) between the major body 12c and the ends 12a and 12b, respectively.

The bearings 18 and 19 retaining the ends 12a and 12b of the armature shaft 12 are each implemented by a hollow cylindrical oilless bearing made of, for example, a porous metallic sleeve containing lubricant oil.

The bearing 18 retaining the end 12a of the armature shaft 12 is press-fit to an inner peripheral wall of the bearing mount 17a in abutment of an end thereof (i.e., a right end in the drawing) with the end wall of the end frame 17. The other end of the bearing 18 extends outside the bearing mount 17a in an axial direction of the armature shaft 12. The bearing 19 retaining the end 12b of the armature shaft 12 is press-fit within a cylindrical chamber formed in the output shaft 3d of the speed reducer 3 and has an end (i.e., an left end, as viewed in FIG. 1) located at a given interval away from the end wall of the cylindrical chamber.

The ends 12a and 12b of the armature shaft 12 are retained by the bearings 18 and 19 to be movable in the axial direction of the armature shaft 12. As can be seen from FIG. 1, a right one of the shoulders 12d of the armature shaft 12 is placed in abutment with the end of the bearing 18, while the other shoulder 12d is placed at a given interval away from the wall of the output shaft 3d of the speed reducer 3. This permits the armature shaft 12 to move in the axial direction thereof a distance between the shoulder 12d and the wall of the output shaft 3d. A backward movement (i.e., rightward movement, as viewed in FIG. 1) of the armature shaft 12 is stopped by abutment of the shoulder 12d with the end surface of the bearing 18, while a frontward movement of the armature shaft 12 is stopped by abutment of the shoulder 12d with the output shaft 3d of the speed reducer 3.

The motor 2 also includes a cylindrical commutator 22 which is made up of commutator segments, as clearly illustrated in FIGS. 2(a) and 2(b), retained by an insulator 21. Each of the commutator segments is connected mechanically and electrically to one of armature coils 23 wound around the armature core 20.

The commutator 22 has formed on an outer peripheral surface thereof a plurality of serrate protrusions or V-shaped ridges 24 which extend in parallel over the whole of the circumference of the commutator 22 in a direction of rotation of the commutator 22. The ridges 24 are arrayed in a width-wise direction (i.e., a horizontal direction, as viewed in FIGS. 2(a) and 2(b)) of the commutator surface.

Carbon brushes 25 ride on the surface of the commutator 22. Each of the carbon brushes 25 has formed in a bottom wall thereof serrate protrusions which mesh with the ridges 24 of the commutator 22 under pressure, as produced by a brush spring 26. Each of the brushes 25 is retained by a brush holder 27 and urged by the brush spring 26 into constant abutment with the surface of the commutator 22. The brush springs 26 are each implemented by, for example, a spiral spring. A combination of each of the brush holders 27 and each of the brush springs 26 may be of a known structure, and explanation thereof in detail will be omitted here. The protrusions may be formed on the bottom walls of the brushes 25 by rotating the commutator 22 in contact of the ridges 24 with the bottom walls of the brushes 25 to dig ditches in the bottom walls.

In operation of the starter 1, when the starter switch is closed to energize the excitation coil of the solenoid switch 8, it will cause the plunger to be magnetically attracted rightward, as viewed in FIG. 1, to swing the shift lever 7, thereby transmitting the movement of the plunger to the clutch 5. This causes the clutch 5 to be moved away from the motor 2 along the output shaft 4 together with the pinion gear 6 until the end surface of the pinion gear 6 hits the end surface of the ring gear of the engine.

Afterwards, the plunger continues to be attracted and closes the main contacts of the main circuit of the motor 2. The motor 2 is supplied with power from the battery, so that the armature 11 undergoes an electromagnetic force, as produced by the field system, and produces torque. The torque is increased in magnitude by the speed reducer 3 and transmitted to the output shaft 4 and to the pinion gear 6 through the clutch 5. When the pinion gear 6 has reached an angular position where the pinion gear 6 is meshable with the ring gear, the pinion gear 6 is thrust into engagement with the ring gear. Upon completion of engagement of the pinion gear 6 with the ring gear, the torque is transmitted from the pinion gear 6 to the ring gear to crank the engine.

When, after start-up of the engine, the starter switch is opened, the excitation coil of the solenoid switch 8 is deenergized so that the magnetic attraction disappears, and the plunger is returned (i.e., leftward in FIG. 1) by the return spring. This causes the main contacts of the motor 2 to be opened to stop the supply of power to the motor 2. The motor 2 stops rotating the armature 11. The returning movement of the plunger also causes the clutch 5 to be pulled backward by the shift lever 7 to bring the pinion gear 6 into disengagement from the ring gear. The pinion gear 6 moves toward the motor 2 along the output shaft 4 together with the clutch 5.

The feature of the structure of the stator 1 will be described below.

Figure 3:
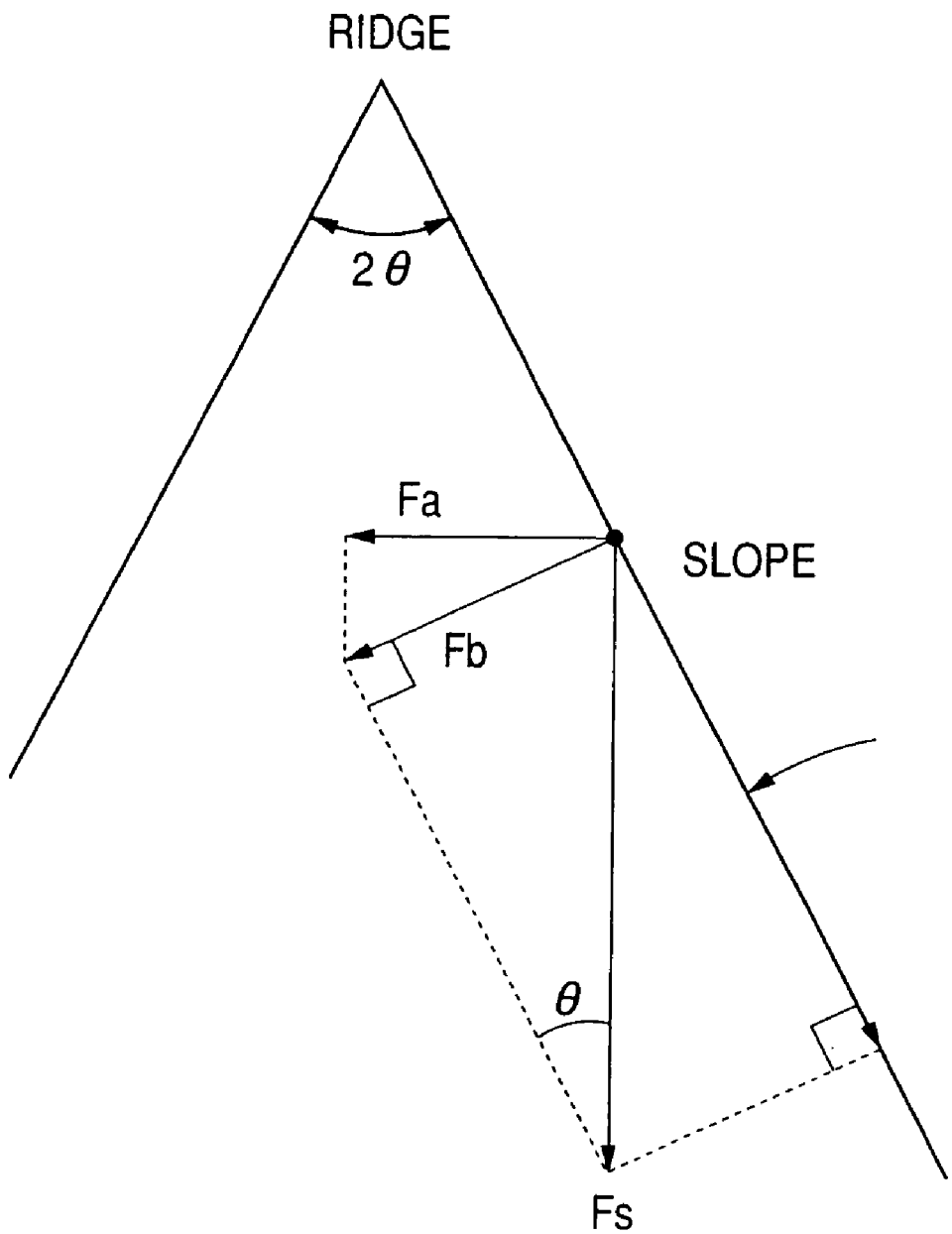
FIG. 3 is a view which shows components of pressure acting on each of ridges formed on a commutator surface in the starter of FIG. 1.

During rotation of the commutator 22, each of the brushes 25 is in engagement of the serrate protrusions thereof with V-shaped grooves each of which is defined between adjacent two of the ridges 24 of the commutator 22, thereby minimizing vibrations of the armature 11 in the axial direction thereof. Specifically, when the armature 11 is shifted from a correct position, as illustrated in FIG. 2(a), by a distance Δx in the axial direction thereof, as illustrated in FIG. 2(b), it will result in shifting of the commutator 22 from the brushes 25, so that the serrated protrusions of the brushes 25 are somewhat lifted up from the ridges 24. The load Fs, as produced by the brush spring 26, acts on a slant surface of each of the ridges 24, as illustrated in FIG. 3, to produce a component Fa urging the slant surface in the axial direction of the commutator 22. The load component Fa works to return the armature 11 to the initial position to reduce the axial vibrations of the armature 11. Fb indicates a component of the load Fs oriented perpendicular to the slant surface of the ridges 24.

A thrust load acting on the armature 11 which arises from pulsations of torque cranking the engine is, therefore, decreased, thereby resulting in a decrease in pressure exerted on the shoulder 12d of the armature shaft 12 and the end surface of the bearing 18. This eliminates the need for a flange on the end of the bearing 18 and permits the bearing 18 to be implemented by a simple oilless bearing such as an oil-impregnated bearing, thus resulting in a decrease in manufacturing cost of the starter 1. The need is also eliminated for increasing an area of contact between the shoulder 12d of the armature shaft 12 and the end of the bearing 18 in order to decrease the pressure acting thereon, thus increasing the degree of freedom of selection of outer diameters of the armature shaft 12 and the end 12a.

The decrease in pressure exerted on the area of contact between the shoulder 12d of the armature shaft 12 and the end of the bearing 18 serves to avoid the seizure or wear therebetween without having to use separate parts such as washers.

The formation of the ridges 24 on the surface of the commutator 22 results in an increase in area of contact between the commutator 22 and the brushes 25. The engagement of the ridges 24 with the grooves between the serrate protrusions on the brushes 25 ensures the stability of electrical contacts between the commutator 22 and the brushes 25.

Figure 4:
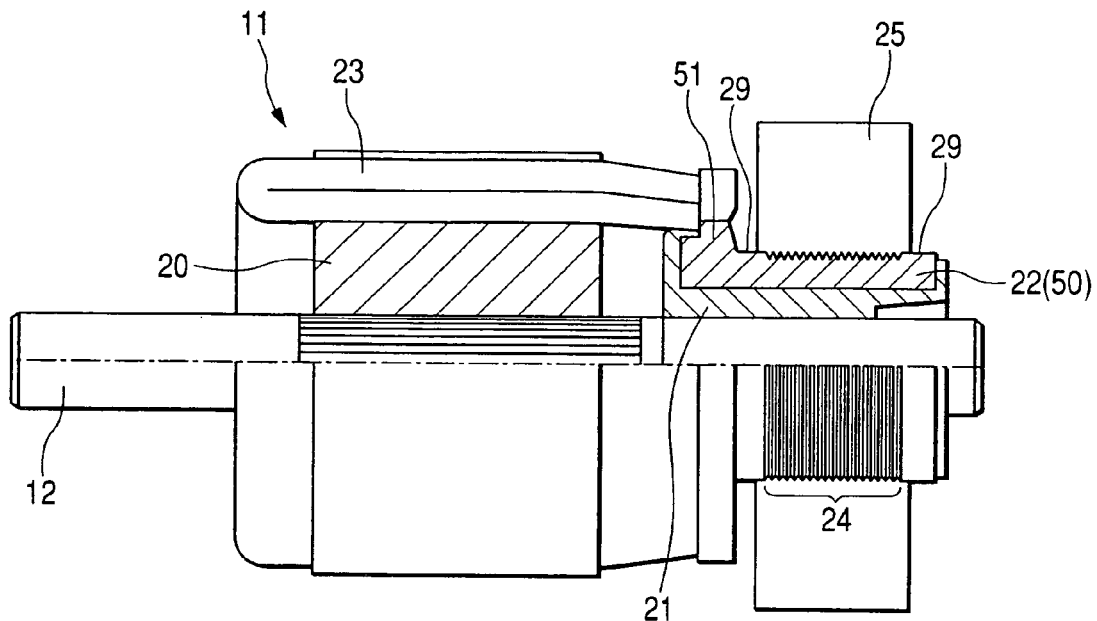
FIG. 4 is a partial sectional view which shows an electric rotary machine according to the second embodiment of the invention.

FIG. 4 shows the armature 11 according to the second embodiment of the invention which may be installed in the starter 1, as illustrated in FIG. 1.

The armature 11, like the first embodiment, consists of the armature shaft 12, the armature core 20 fitted on the armature shaft 12 through serrations, the armature coils 23 wound around the armature core 20, and the commutator 22 installed on an end of the armature shaft 12.

The commutator 22 is made up of commutator segments 50 retained by the insulator 21 and arrayed circumferentially of the armature shaft 12 in the form of a hollow cylinder.

Each of the commutator segments 50 has a riser 51 which is mechanically and electrically joined to one of the armature coils 23. The commutator 22 has, like the first embodiment, the V-shaped ridges 24 form on the outer peripheral surface thereof. The ridges 24 may be formed by machining V-shaped grooves extending in parallel over the whole of the circumference of the commutator 22 in a direction perpendicular to the axis of the commutator 22.

The carbon brushes 25, like the first embodiment, ride on the surface of the commutator 22. Each of the carbon brushes 25 has formed in a bottom wall thereof serrate protrusions which mesh with the ridges 24 of the commutator 22 under pressure, as produced by a brush spring (not shown). Each of the brushes 25 is retained by a brush holder (not shown) and urged by the brush spring into constant abutment with the surface of the commutator 22. A combination of each brush holder and each brush spring is identical in structure with the one in the first embodiment.

Figure 5:
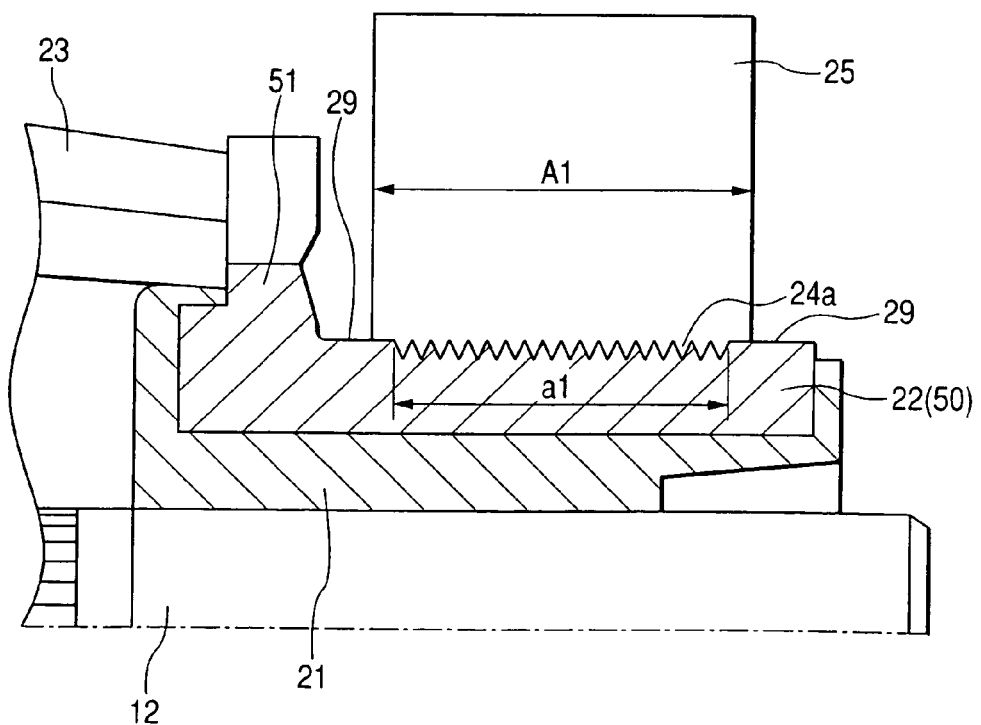
FIG. 5 is a partially enlarged view which shows engagement of a brush with a commutator surface in the electric rotary machine of FIG. 4.

The commutator 22, as illustrated in FIG. 5, has substantially V-shaped grooves 24a formed in the outer peripheral surface thereof. The grooves 24a extend in parallel to each other in a circumferential direction of the commutator 22 in which the brushes 8 is to slide on the commutator 22 and are arrayed at equi-intervals away from each other in a widthwise direction of the commutator 22 (i.e., the axial direction of the armature shaft 12) to define the ridges 24.

The peripheral surface of the commutator 22 excluding the risers 51 is made up of annular flat and smooth areas 29 and an annular central area which extends between the flat areas 29 and is occupied by the ridges 24. The grooves 24a are deeper than the flat areas 29. In other words, the top of each of the ridges 24 lies flush with the flat areas 29.

The range a1 in the widthwise direction of the commutator 22 within which the ridges 24 are formed is smaller than the width A1 of each of the brushes 25, as viewed from the widthwise direction of the commutator 22, and lies within an area of the surface of the commutator 22 on which the brushes 25 are to slide. Accordingly, end portions of the bottom of each of the brushes 25 which are opposed in the widthwise direction of the commutator 22 slide on the flat areas 29 of the commutator 22.

Figure 12:
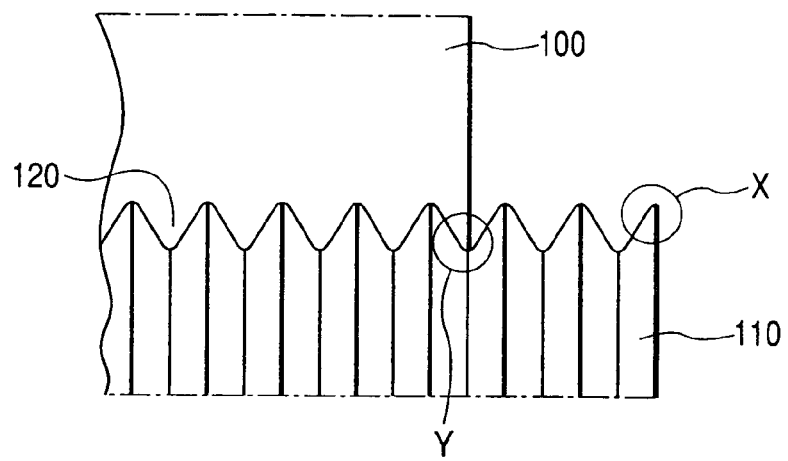
FIG. 12 is a partial view which shows engagement of a commutator surface with a brush in a prior art motor.

As described above, the peripheral surface of the commutator 22 has the flat areas 29 on which protrusions or grooves are not formed. FIG. 12 shows grooves 120 which are formed in the peripheral surface of a commutator 110 in order to ensure the stability of electrical contact between a brush 100 and the commutator 110 for enhancing the performance of an electric motor. Such a structure is disclosed in Japanese Patent First Publication No. 62-118732. The grooves 120 occupy the entire width of the commutator 110, that is, lie from end to end of the peripheral surface of the commutator 110, which may cause a ridge, as indicated by X, to be formed at the end of the commutator 110. The ridge X is thin and lower in strength. Similarly, a ridge, as indicated by Y, may also be formed on an end of the brush 100. In a case where such a type of motor is used in a starter for starting internal combustion engines, the brush 100 and the commutator 110 may undergo high vibrations arising from the engine and crack. The commutator 22 of the starter 1 of this embodiment, as described above, has the flat areas 29 formed on the ends of the peripheral surface thereof on which the brushes 25 partially slide, thus avoiding the cracking of the edges of the commutator 22 and the brushes 25. The formation of the flat areas 29 facilitates machining of the grooves 24a without having to pay attention to the ends of the commutator 22.

Figure 6:
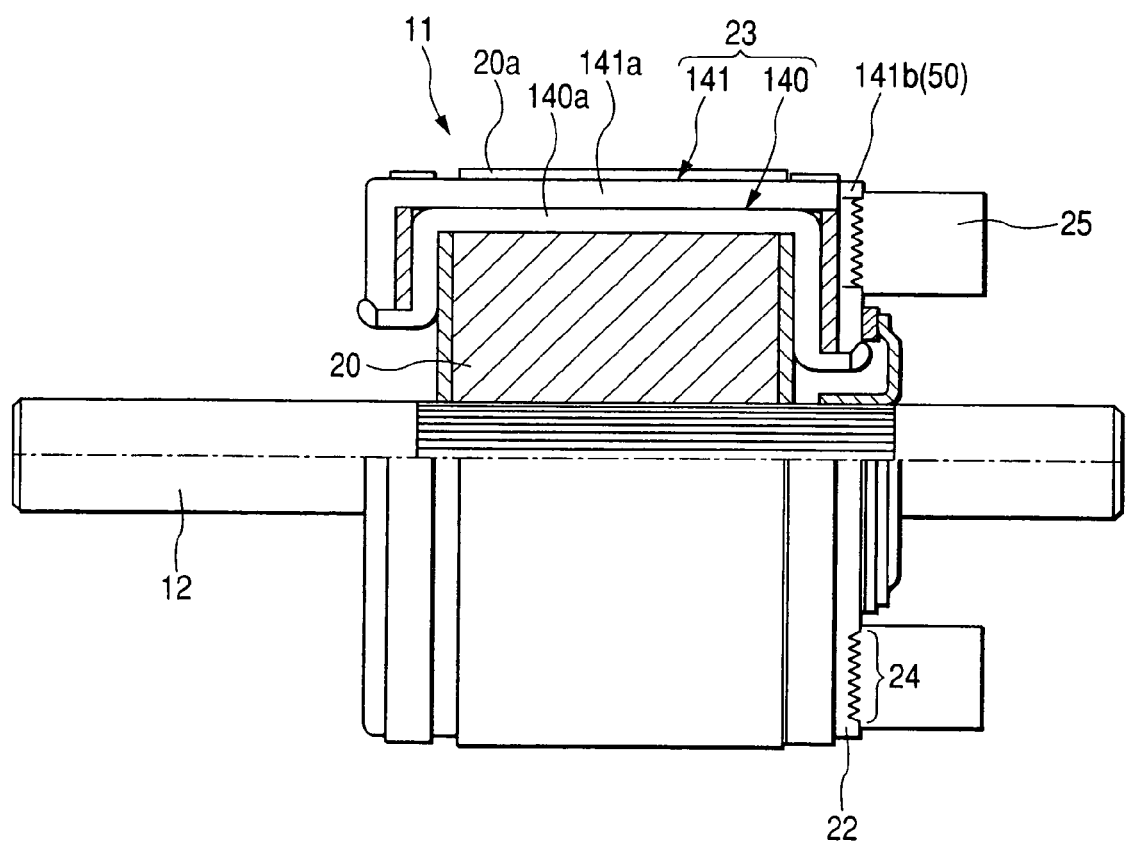
FIG. 6 is a partial sectional view which shows an electric rotary machine according to the third embodiment of the invention.

FIG. 6 is a partially sectional view which shows the armature 11 according to the third embodiment of the invention which may be installed in the starter 1, as illustrated in FIG. 1.

The armature 11 has the commutator 22 extending perpendicular to the axis of the armature shaft 12. Specifically, a portion of each of the armature coils 23 extending outside one of slots 20a of the armature core 20 is disposed in parallel to an end surface of the armature core 20 to form one of the commutator segments 50.

The armature coils 23 include as many combinations of lower coil layers 140 and upper coil layers 141 as the slots 20a. Each of the lower coil layers 140 has a straight section 140a. Similarly, each of the upper coil layers 141 has a straight section 141a. Each of the straight sections 140a is laid to overlap with one of the straight sections 141a within one of the slots 20a. An end of each of the lower coil layers 140 extending outside one of the slots 20a is joined to an end of one of the upper coil layers 141 extending outside another of the slots 20a. Such joining is achieved after the upper and lower coil layers 141 and 140 are inserted into the slots 20a and arranged inside the armature core 20.

Each of the upper coil layers 141 has a coil end 141b continuing from the straight section 141a disposed in the slot 20a. The coil end 141b extends outside the slot 20a in parallel to the end wall of the armature core 20 and serves as one of the commutator segments 50. The commutator segments 50 are arrayed circumferentially of the end wall of the armature core 20 to form the commutator 22. The commutator 22 has a major surface (i.e., the commutator surface facing right, as viewed in FIG. 6) on which the carbon brushes 25 ride. Each of the brushes 25 is retained by a brush holder (not shown) and urged by a brush spring (not shown) into constant abutment with the commutator surface. A combination of each brush holder and each brush spring may be of a known structure, and explanation thereof in detail will be omitted here.

Figure 7:
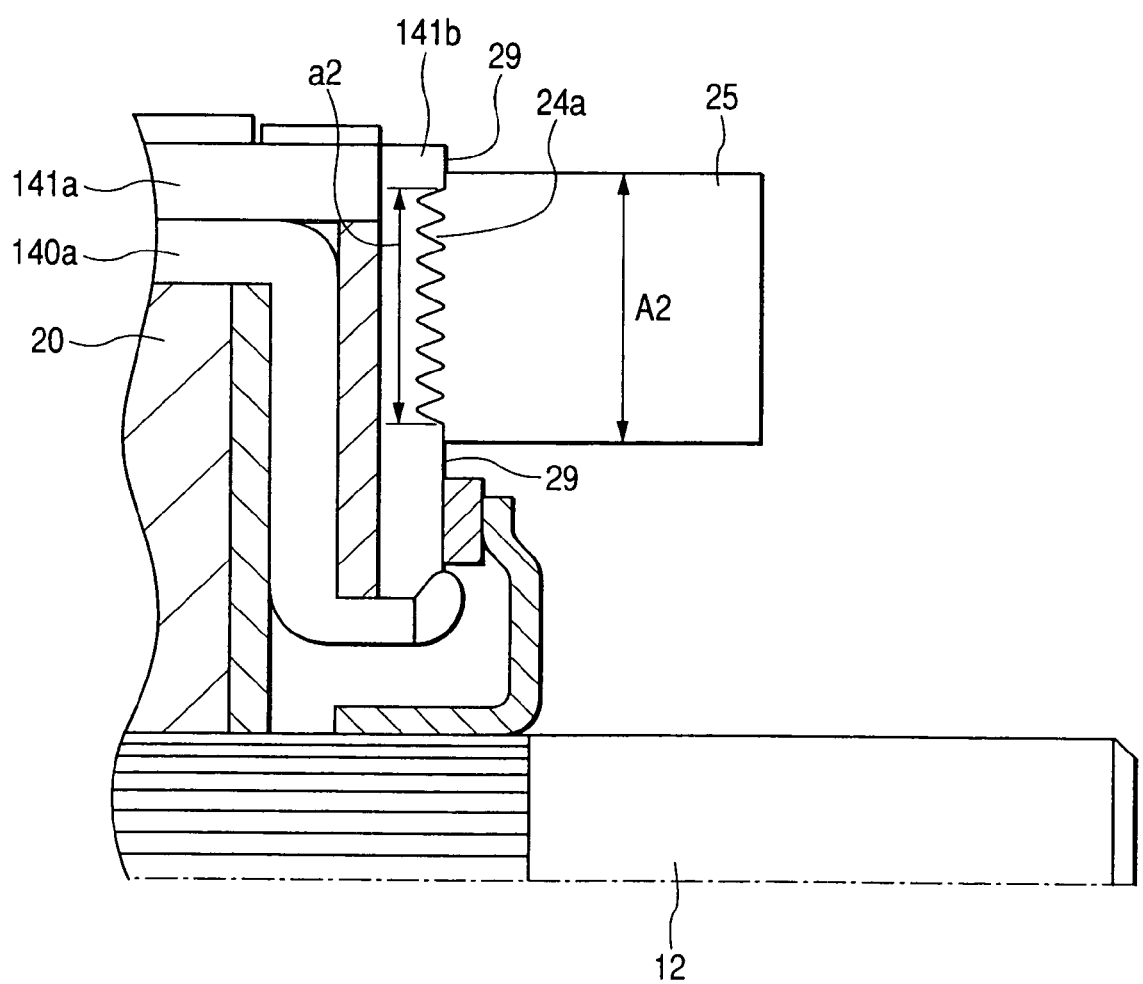
FIG. 7 is a partially enlarged view which shows engagement of a brush with a commutator surface in the electric rotary machine of FIG. 6.

The ridges 24 are defined, as illustrated in FIG. 7, by the grooves 24a formed in the commutator surface in the form of closed loops. The grooves 24a extend coaxially with the axis of the armature shaft 12 at equi-intervals away from each other. The commutator surface, like the second embodiment, is made up of the annular flat and smooth areas 29 and an annular area which extends between the flat areas 29 and is occupied by the ridges 24. The top of each of the ridges 24 lies flush with the flat areas 29.

The range a2 in the radius direction of the commutator surface within which the grooves 24a are formed is smaller than the width A2 of each of the brushes 25, as viewed from the radius direction of the commutator 22, and lies within an area of the commutator surface on which the brushes 25 are to slide. Accordingly, end portions of the bottom of each of the brushes 25 which are opposed in the radius direction of the commutator 22 slide on the flat areas 29 of the commutator 22.

The commutator 22 of the starter 1 of this embodiment, like the second embodiment, has the flat areas 29 formed on the outer circumference and center of the commutator surface on which the brushes 25 partially slide, thus avoiding the cracking of the outer peripheral edge of the commutator 22 and outside and inside edges of the bottoms of the brushes 25 which may arise from vibrations transmitted from the engine.

The commutator segments 50 may alternatively be formed by special material separate from the coil end 141b of the armature coils 23.

Figure 8:
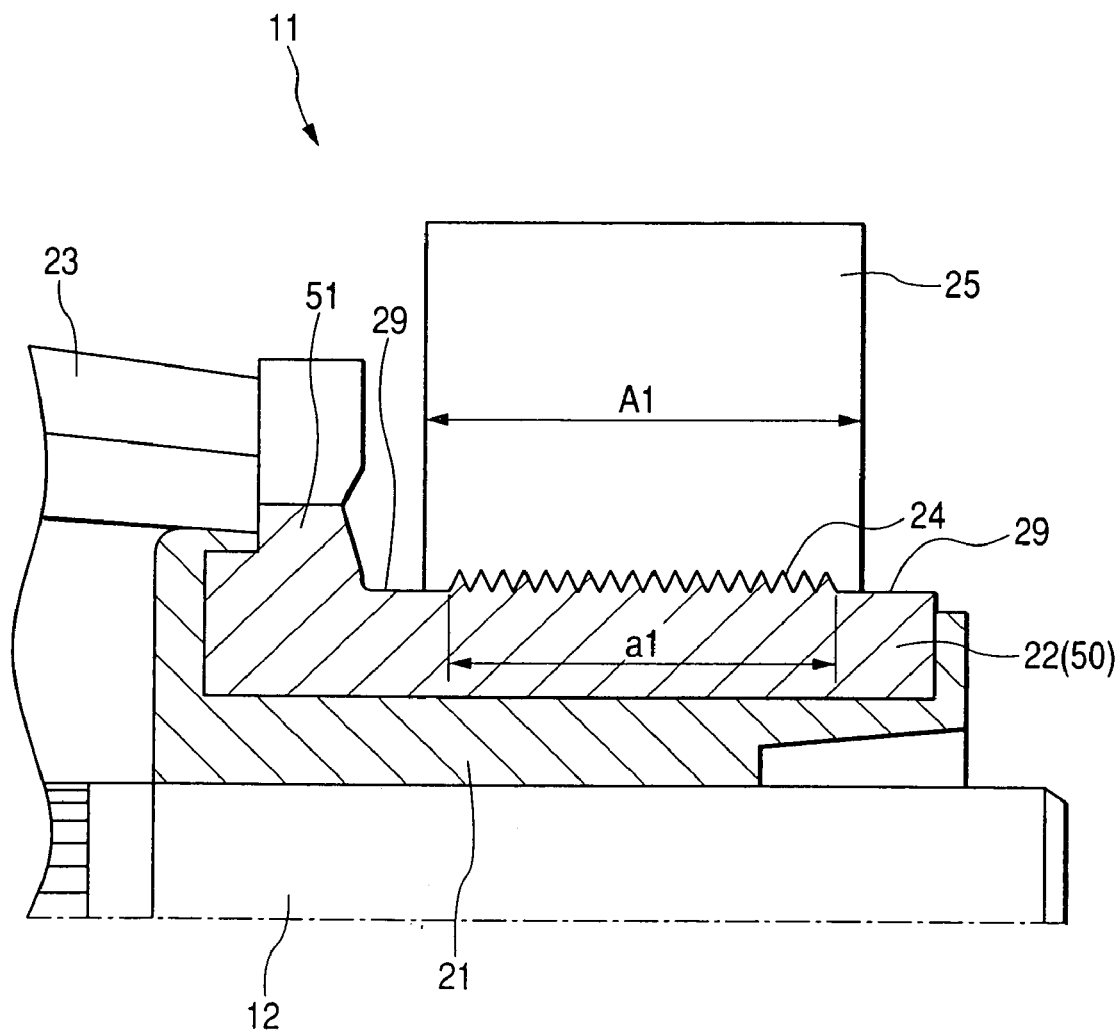
FIG. 8 is a partially enlarged view which shows engagement of a brush with a commutator surface in an electric rotary machine according to the fourth embodiment of the invention.

FIG. 8 shows the armature 11 according to the fourth embodiment of the invention which is a modification of the one in the second embodiment, as illustrated in FIGS. 4 and 5.

The commutator 22 has the V-shaped ridges 24 which, unlike the second embodiment, protrude from the flat areas 29 of the commutator surface in the radius direction of the commutator 22.

The range a1 in the widthwise direction of the commutator 22 within which the ridges 24 are formed is, like the second embodiment, smaller than the width A1 of each of the brushes 25, as viewed from the widthwise direction of the commutator 22, and lies within an area of the surface of the commutator 22 on which the brushes 25 are to slide. Accordingly, end portions of the bottom of each of the brushes 25 which are opposed in the widthwise direction of the commutator 22 are to slide on the flat areas 29 of the commutator 22.

Other arrangements are identical with those in the second embodiment, and explanation thereof in detail will be omitted here.

Figure 9:
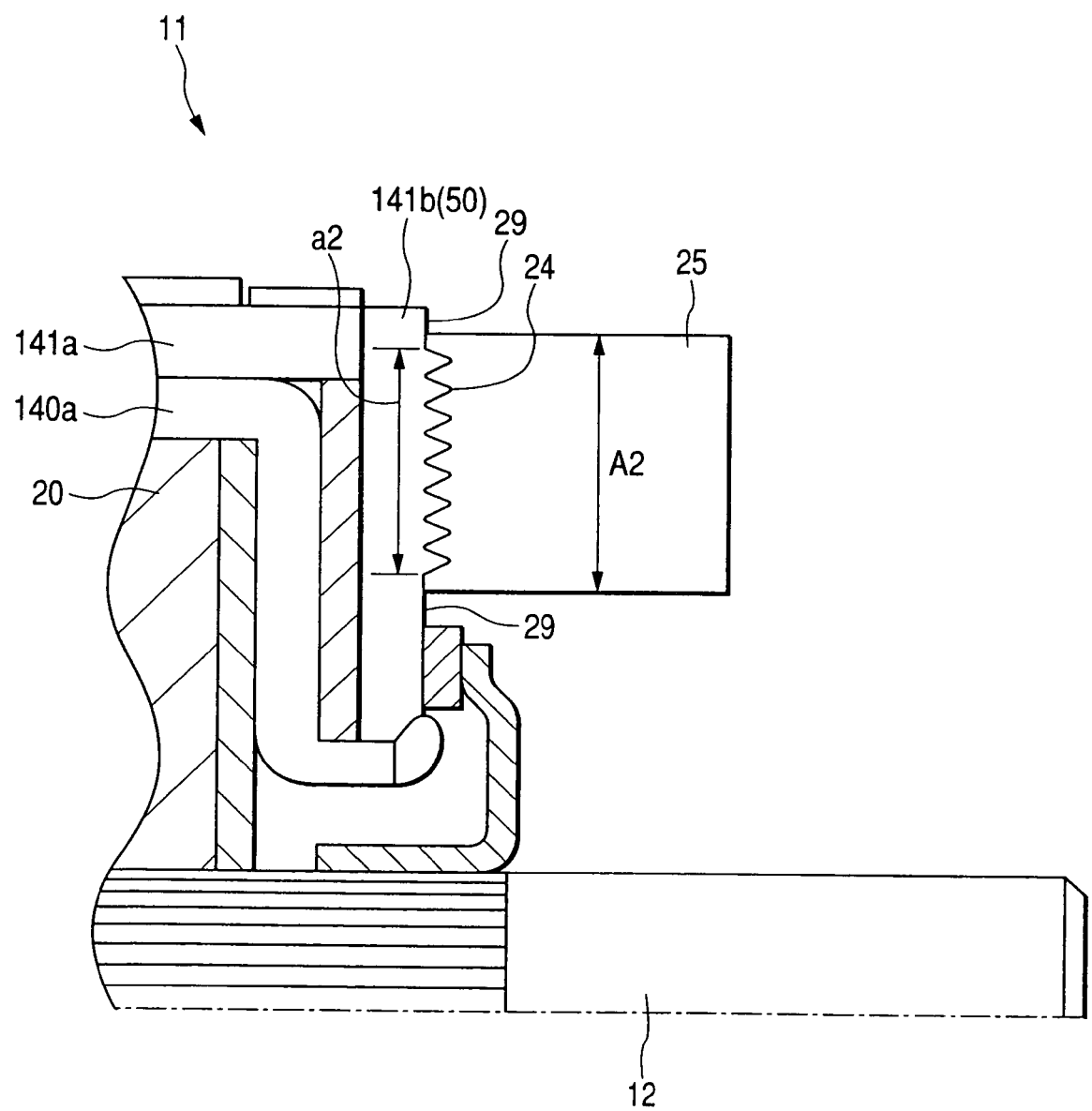
FIG. 9 is a partially enlarged view which shows engagement of a brush with a commutator surface in an electric rotary machine according to the fifth embodiment of the invention.

FIG. 9 shows the armature 11 according to the fifth embodiment of the invention which is a modification of the one in the third embodiment, as illustrated in FIGS. 6 and 7.

The commutator 22 has the V-shaped ridges 24 which, unlike the third embodiment, protrude from the flat areas 29 of the commutator surface in the axial direction of the armature shaft 12.

The range a2 in the radius direction of the commutator surface within which the ridges 24 are formed is, like the third embodiment, smaller than the width A2 of each of the brushes 25, as viewed from the radius direction of the commutator 22, and lies within an area of the commutator surface on which the brushes 25 are to slide. Accordingly, end portions of the bottom of each of the brushes 25 which are opposed in the radius direction of the commutator 22 slide on the flat areas 29 of the commutator 22.

Other arrangements are identical with those in the third embodiment, and explanation thereof in detail will be omitted here.

Figure 10:
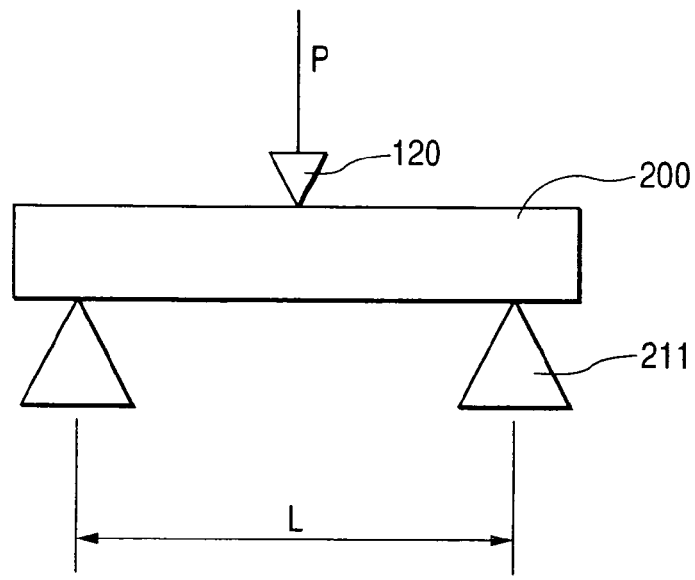
FIG. 10 is a view which shows a bending strength test machine.

We calculated a desired bending strength of the brushes 25 in each of the first to fifth embodiments in the manner, as described below. FIG. 10 shows a bending strength test machine we used.

First, we prepared a test piece 200 having a given length and a rectangular cross section.

We placed the test piece 200 on two supports 211 arrayed at a given interval away from each other.

We put a wedge 120 on the center of the test piece 200 and pressed it at a constant velocity of 29 N/s or less and measured a maximum load applied to the test piece 200 when broken.

We determined the bending strength of the test piece 200 according to an equation of $8 \times P \times L / (2 \times A \times B^2)$ where L is the distance (cm) between the supports 211, A is the width (cm) of the test piece 200, B is the thickness (cm) of the test piece 200, and P is the maximum load (N) when the test piece 10 is broken.

Finally, we calculated the bending strength of the brushes 25 based on that of the test piece 200, as determined in the above manner.

The brushes 25, as used in each of the above embodiments and embodiments which will be discussed later, are preferably designed to have a bending strength of 16 MPa or more, as determined in the above manner.

Figure 11:
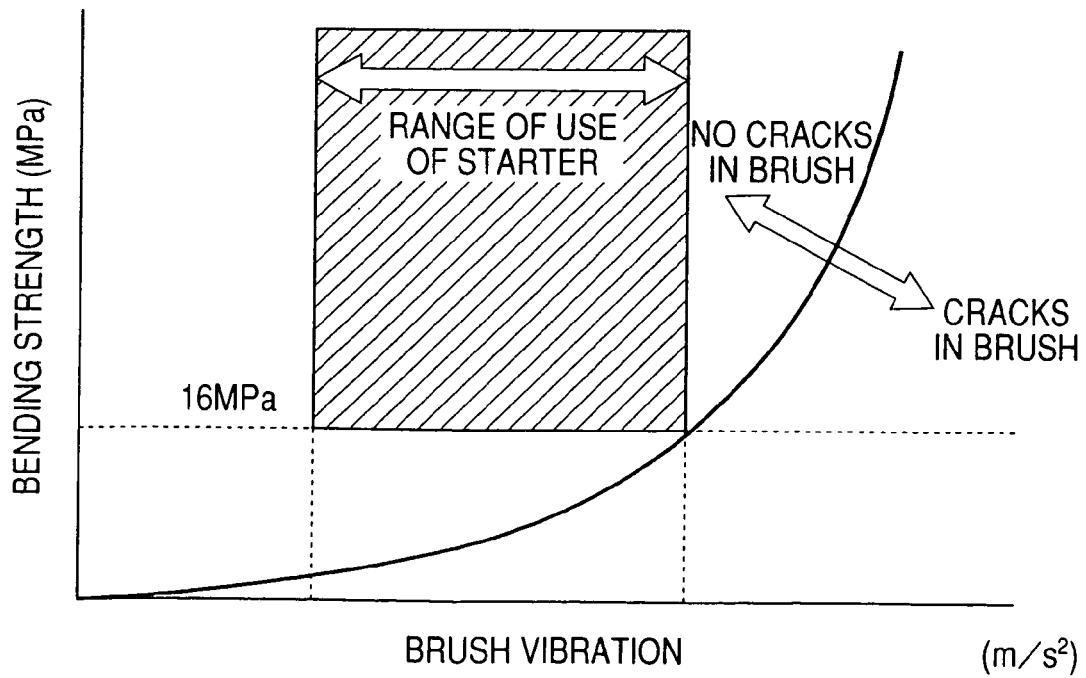
FIG. 11 is a view which shows a relation between the bending strength of a brush and mechanical vibrations applied to the brush.

The starter 1, as described above, usually undergoes high vibrations transmitted from the engine, thus increasing ease with which the brushes 25 crack as the bending strength of the brushes 25 decreases. We experimentally found a relation between the bending strength of the brushes 25, as determined in the above manner, and mechanical vibrations applied to the brushes 25. FIG. 11 represents test data on such a relation. The test data shows that when the bending strength of the brushes 25 is 16 MPa or more, cracks arising from the vibrations applied to the motor 2 of the starter 1 do not occur in the brushes 25 in the range of practical use of the motor 2.

Each of the brushes 25 may be made of a stack of bonded layers which have resistance values different from each other. In this case, the value derived by multiplying bending strengths of the layers by area ratios and averaging them is preferably 16 MPa or more. For instance, if each of the brushes 25 is made of a stack of two layers: one having one-fourth of a total area of the two layers and the other having three-fourth of the total area, the averaged bending strength is determined by multiplying the bending strength of the one of the layers by one-fourth, multiplying the bending strength of the other of the layers by three-fourth, and averaging them.

Figure 13:
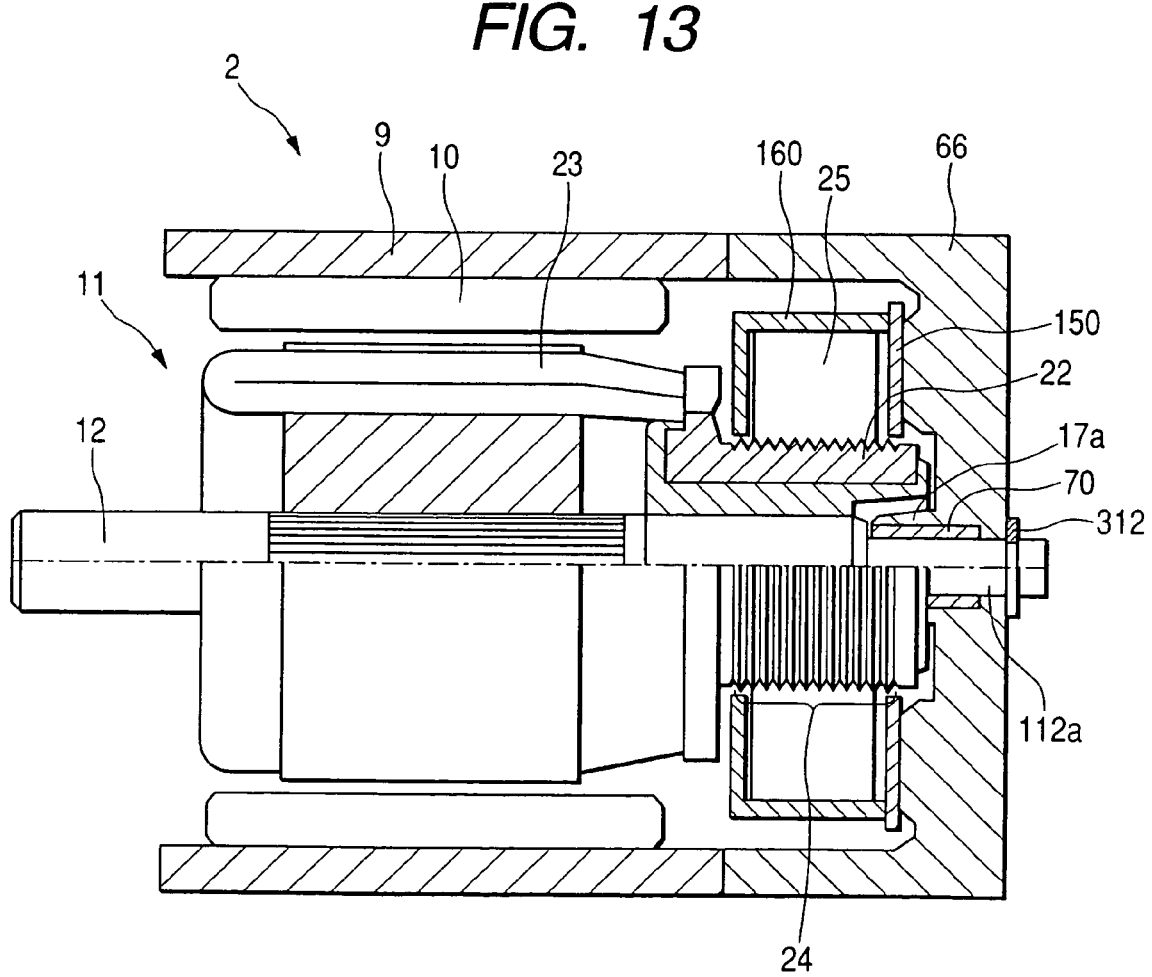
FIG. 13 is a longitudinal sectional view which shows an electric rotary machine according to the sixth embodiment of the invention.

FIG. 13 shows the starter motor 2 according to the sixth embodiment of the invention.

The starter motor 2, like the above embodiments, includes the yoke 9. The yoke 9 is made of a hollow cylinder and joined at an open end thereof to an end frame 66 to define a casing of the starter motor 2.

The armature shaft 12 of the motor 2 has an end 112a retained by the end frame 66 through a bearing 70. The bearing 70 is a sleeve bearing (also called plain bearing) and press-fit in the bearing amount 17a. The bearing 70, as can be seen from FIG. 14, has an end which lie flush with an end of the bearing mount 17a in the radius direction of the armature shaft 12 without protruding toward the armature 11.

The end 112a is smaller in diameter than a major body of the armature shaft 12 to form a shoulder 112b. The shoulder 112b serves as a stopper to hold the armature shaft 12 from moving rightward, as viewed in FIG. 14. Specifically, the shoulder 112b faces the ends of the bearing mount 17a and the bearing 70 in the axial direction of the armature shaft 12 and works to stop the rightward movement of the armature shaft 12 when the shoulder 112b moves and abuts the ends of the bearing mount 17a and the bearing 70.

Figure 14:
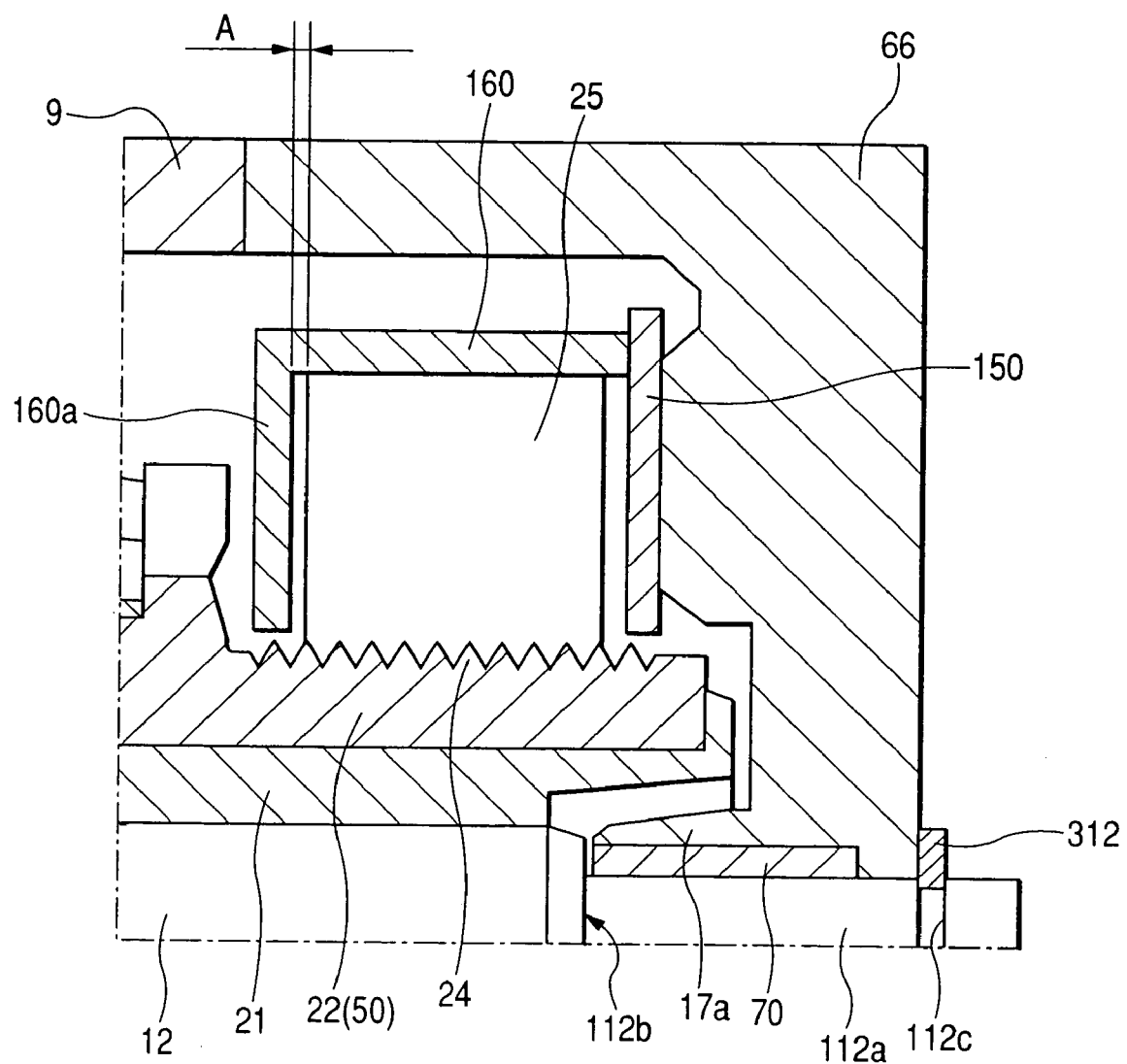
FIG. 14 is a partially enlarged sectional view which shows an internal structure of the electric rotary machine of FIG. 13.

The end 112a of the armature shaft 12 extends outside an outer wall of the end frame 66. A washer 312 is fitted in an annular groove 112c formed in the end 112a to secure the armature shaft 12 to the end frame 66, thereby holding the armature shaft 12 from moving away from the end frame 66. In the position, as illustrated in FIG. 14, the shoulder 112b is away from the ends of the bearing mount 17a and the bearing 70 through a given gap. This permits the armature shaft 12 to move back and forth within the gap.

The commutator 22 is, like the above embodiments, made up of commutator segments 50 retained by the insulator 21 in the form of a cylinder. Each of the commutator segments 50 is connected mechanically and electrically to one of armature coils 23 wound around the armature core 20.

The commutator 22, like the above embodiments, has formed on the outer peripheral surface thereof the V-shaped ridges 24 which extend in parallel over the whole of the circumference of the commutator 22 in a direction of rotation of the commutator 22.

The carbon brushes 25 ride on the peripheral surface of the commutator 22. Each of the carbon brushes 25 has formed in a bottom wall thereof serrate protrusions which mesh with the ridges 24 of the commutator 22 under pressure, as produced by a brush spring (not shown), to make an electrical contact with the commutator 22.

Each of the brushes 25 is retained by a brush retaining mechanism. The brush retaining mechanism is implemented by a box consisting of a holder plate 150 affixed to an inner wall of the end frame 66 and a brush holder 160 joined to the holder plate 150. The holder plate 150 is made of an annular metal plate with a central opening and, as clearly illustrated in FIG. 13, attached at one of opposed major surfaces thereof directly to the inner wall of the end frame 66 which faces in the axial direction of the armature shaft 12. The holder plate 150 extends perpendicular to the axial direction of the armature shaft 12 and serves as an earth plate to which a negative lead (not shown) of each of the brushes 25 is grounded.

Each of the brush holders 160, as illustrated in FIG. 14, has a holder wall 160a facing a corresponding one of the brushes 25 in the axial direction of the armature shaft 12. The holder wall 160a is so located as to be kept away from the brush 25 through a gap A when the armature 11 is at a position, as illustrated in FIG. 14, farthest from the end frame 66 within the range where the armature shaft 12 is, as described above, allowed to move within the gap between the shoulder 112b and the ends of the bearing mount 17a and the bearing 70.

The commutator 22 is, as described above, in electrical connection with the brushes 25 through mechanical engagement of the ridges 24 with the grooves formed in the bottoms of the brushes 25 in order to ensure the stability of the electrical connection. The fitting of the ridges 24 in the grooves of the brushes 25 works to hold the brushes 25 from moving relative to the armature 11 in the axial direction. Consequently, when the armature 11 undergoes the vibrations transmitted from the engine, so that it vibrates in the axial direction thereof, it will cause the brushes 25 also to vibrate together with the armature 11. The stoppers (i.e., the shoulder 112b of the armature shaft 12 and the washer 312), however, serve to keep the brushes 25 away from the holder walls 160a at least through the gap A, thus eliminating the need for the brush holders 160 to absorb the vibrations of the brushes 25. The brush holders 160 are, therefore, not required to have an increased mechanical strength. Additionally, during the vibrations of the armature 11, the holder plate 150 to which the brush holders 160 are affixed does not resonate with the brushes 25. Further, when the armature 11 moves toward the end frame 66, so that the brushes 25 hit the holder plate 150, the holder plate 150 absorbs such an impact through the surface thereof placed in direct abutment with the inner wall of the end frame 66. The holder plate 150 is, therefore, not required to have an increased thickness or mechanical strength. The end frame 66 is preferably made of, for example, a die-cast aluminum to have rigidity and strength enough to withstand the impact exerted by the holder plate 150.

The shoulder 112b of the armature shaft 12 and the washer 312, as described above, serve as a stopper mechanism to hold the armature shaft 12 from moving in the axial direction thereof out of the range defined by the gap A. The stopper mechanism lies at one of the ends of the armature shaft 12 which is closer to the brush retaining mechanisms, thus resulting in a decrease in number of parts used to define the gap A between each of the brushes 25 and a corresponding one of the brush holders 160 (i.e., the holder wall 160a). This results in a decrease in assembling tolerance of the parts and facilitates ease of minimizing the gap A, thus permitting the size of the brush retaining mechanisms to be minimized.

Instead of the washer 312, the tip of the end 112a of the armature shaft 12 which protrudes outside the end frame 66 may be plastically deformed, e.g., staked to hold the armature shaft 12 from moving in the leftward direction, as viewed in FIGS. 13 and 14.

Figure 15:
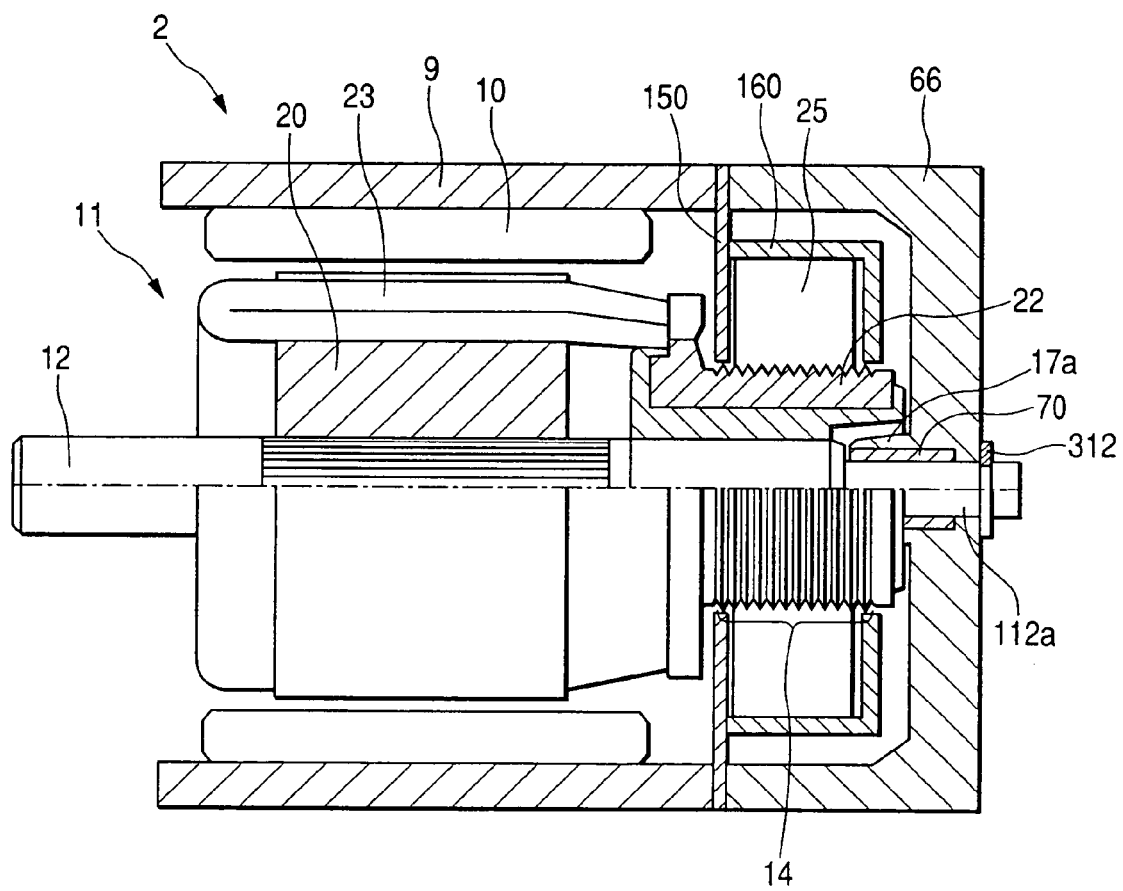
FIG. 15 is a longitudinal sectional view which shows an electric rotary machine according to the seventh embodiment of the invention.
Figure 16:
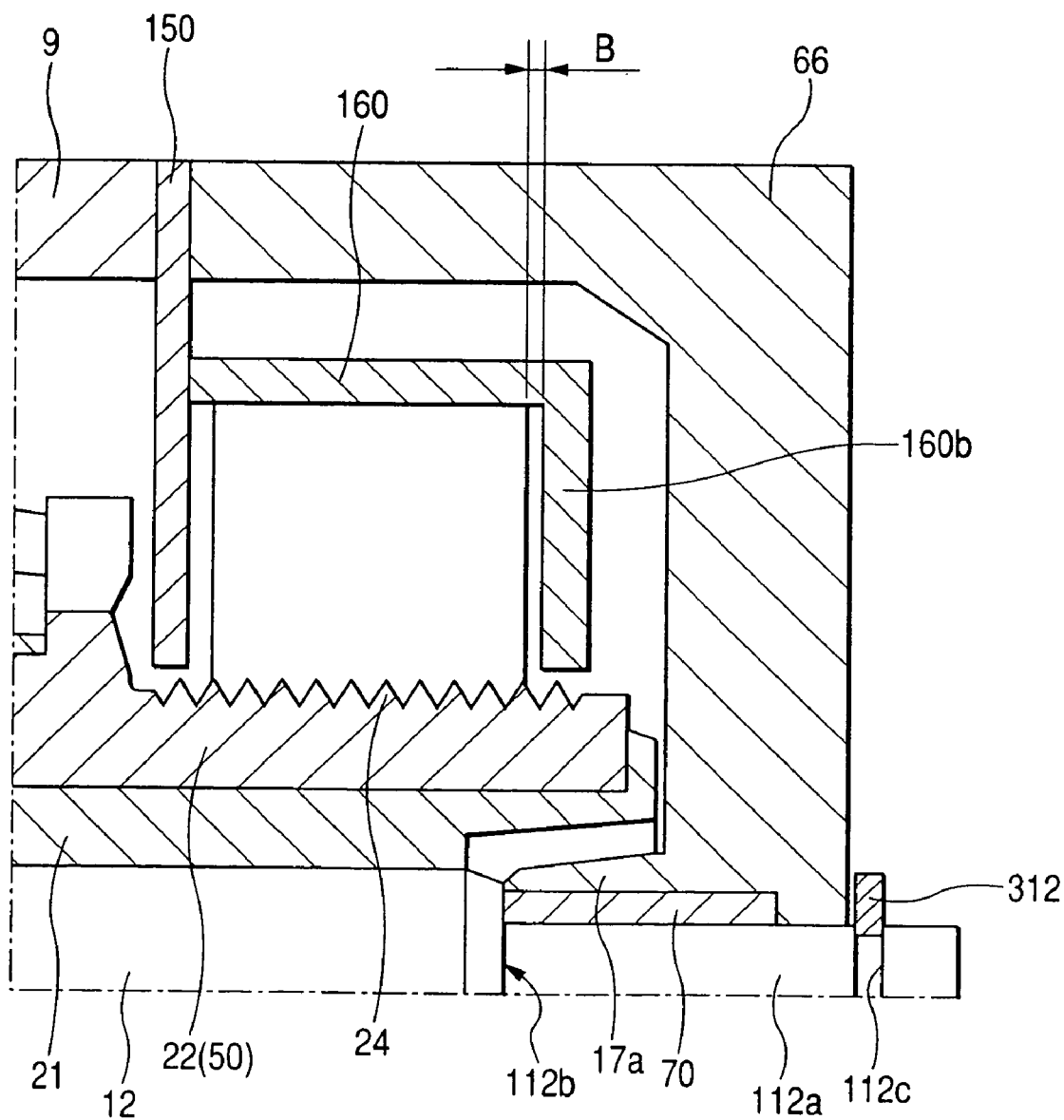
FIG. 16 is a partially enlarged sectional view which shows an internal structure of the electric rotary machine of FIG. 15 when a commutator is in a leftmost position.
Figure 17:
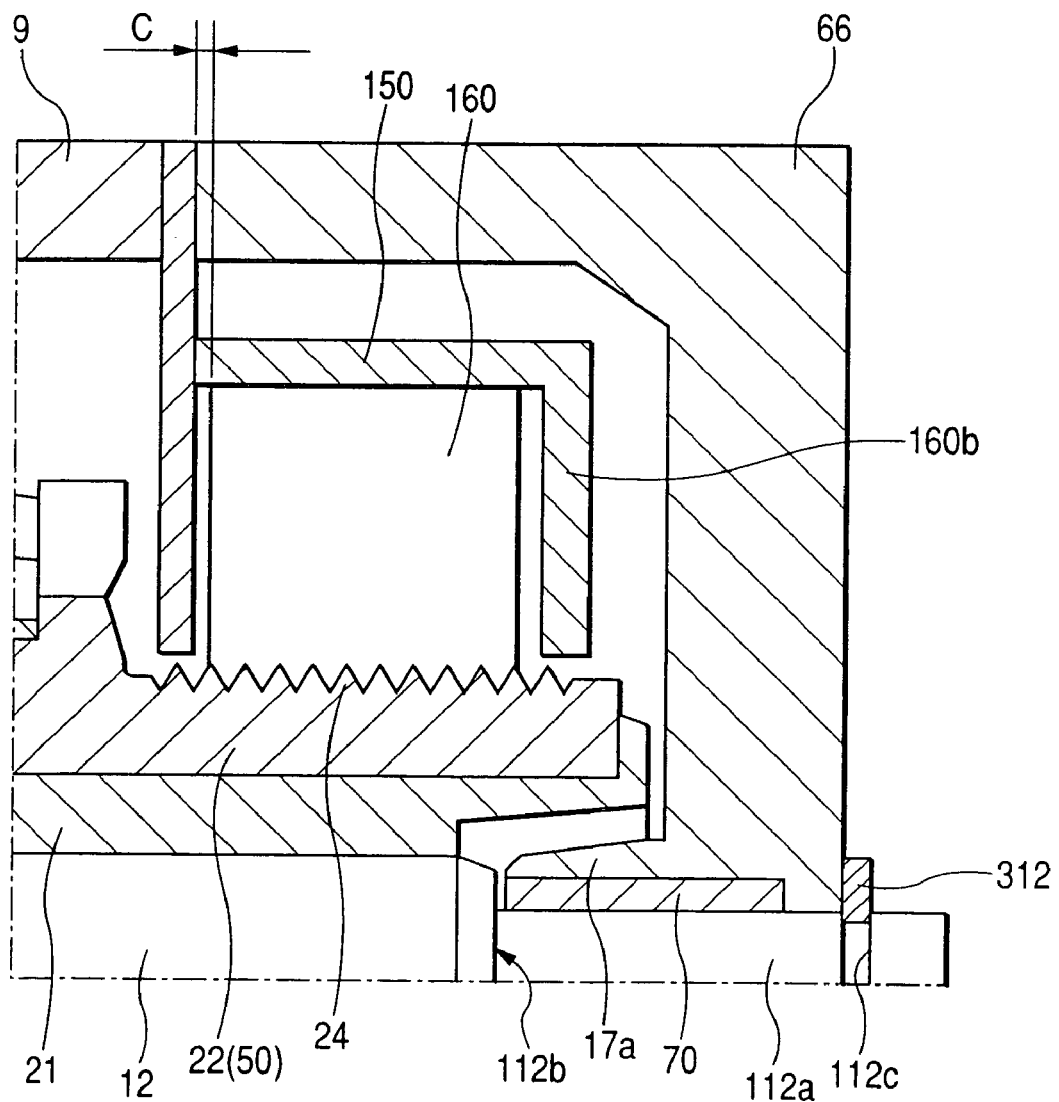
FIG. 17 is a partially enlarged sectional view which shows an internal structure of the electric rotary machine of FIG. 15 when a commutator is in a rightmost position.

FIGS. 15, 16 and 17 show the starter motor 2 according to the seventh embodiment of the invention which is different from the one of the sixth embodiment only in the structure of the brush retaining mechanisms. Other arrangements are identical, and explanation thereof in detail will be omitted here.

The annular holder plate 150 is located closer to the magnets 10 than the brushes 25. The holder plate 150 is nipped at a circumferential edge thereof between the yoke 9 and the end frame 66. Each of the brush holders 160, as illustrated in FIG. 16, has a holder wall 160b located closer to the inner wall of the end frame 66. The holder wall 160b faces the surface of the brush 25 in the axial direction of the armature shaft 12. In other words, the holder wall 160b extends substantially parallel to the surface of the brush 25. The holder wall 160b is so located as to be kept away from the brush 25 through a gap B when the armature 11 is at a position, as illustrated in FIG. 16, closest to the end frame 66, that is, where the shoulder 112b of the armature shaft 12 is placed in abutment with the ends of the bearing 70 and the bearing mount 17a. Additionally, the holder wall 160a is also so located as to be kept away from the brush 25 through a gap C when the armature 11 is at a position, as illustrated in FIG. 17, farthest from the end frame 66, that is, where the washer 312 is placed in abutment with the outer wall of the end frame 66.

Consequently, when the armature 11 vibrates due to the vibrations of the engine, the stoppers (i.e., the shoulder 112b of the armature shaft 12 and the washer 312) serve as the stopper mechanism to keep the brushes 25 away from the holder walls 160b and the holder plate 150, thus eliminating the need for the brush holders 160 and the holder plate 150 to absorb the vibrations of the brushes 25. The brush holders 160 and the holder plate 150 are, therefore, not required to have an increased mechanical strength, e.g., an increased thickness.

The stopper mechanism lies at one of the ends of the armature shaft 12 which is closer to the brush retaining mechanisms, thus resulting in a decrease in number of parts used to define the gaps B and C between the brush 25 and the holder wall 160b and between the brush 25 and the holder plate 150. This results in a decrease in assembling tolerance of the parts and facilitates ease of minimizing the gaps B and C, thus permitting the size of the brush retaining mechanisms to be minimized.

Figure 18:
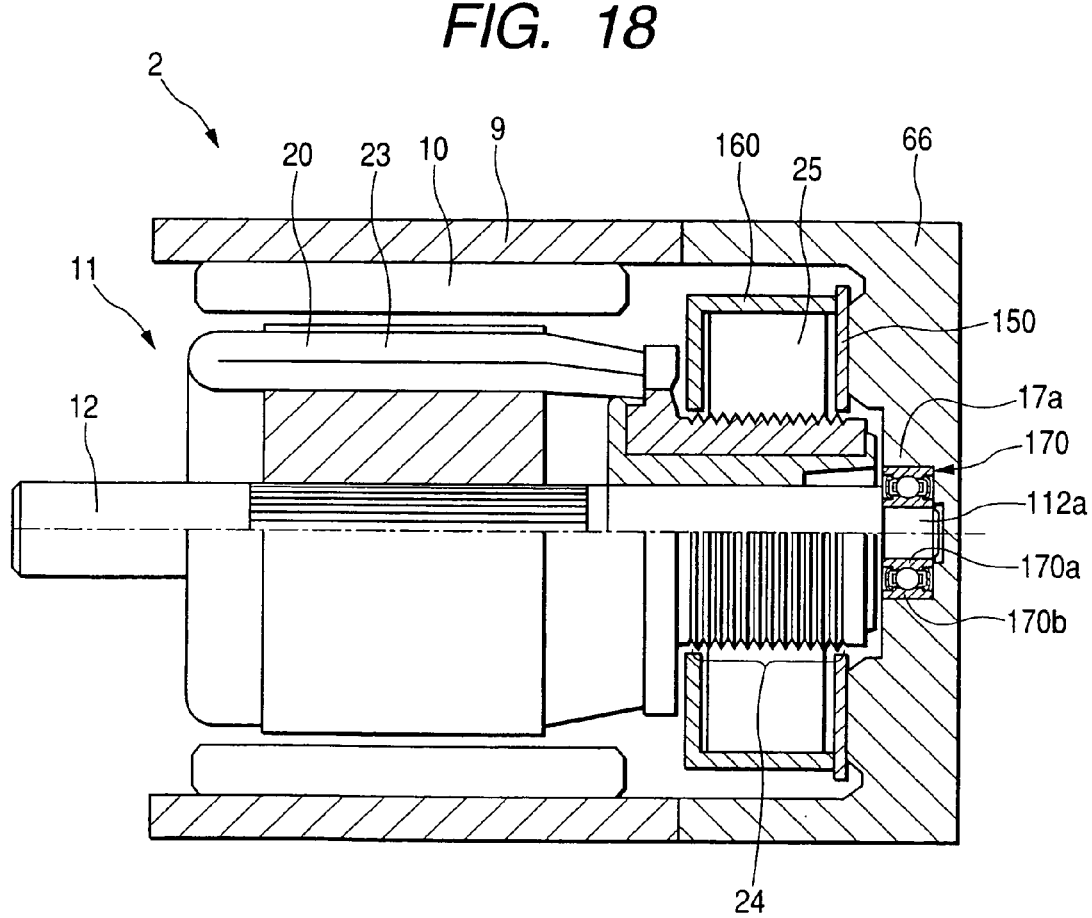
FIG. 18 is a longitudinal sectional view which shows an electric rotary machine according to the eighth embodiment of the invention.
Figure 19:
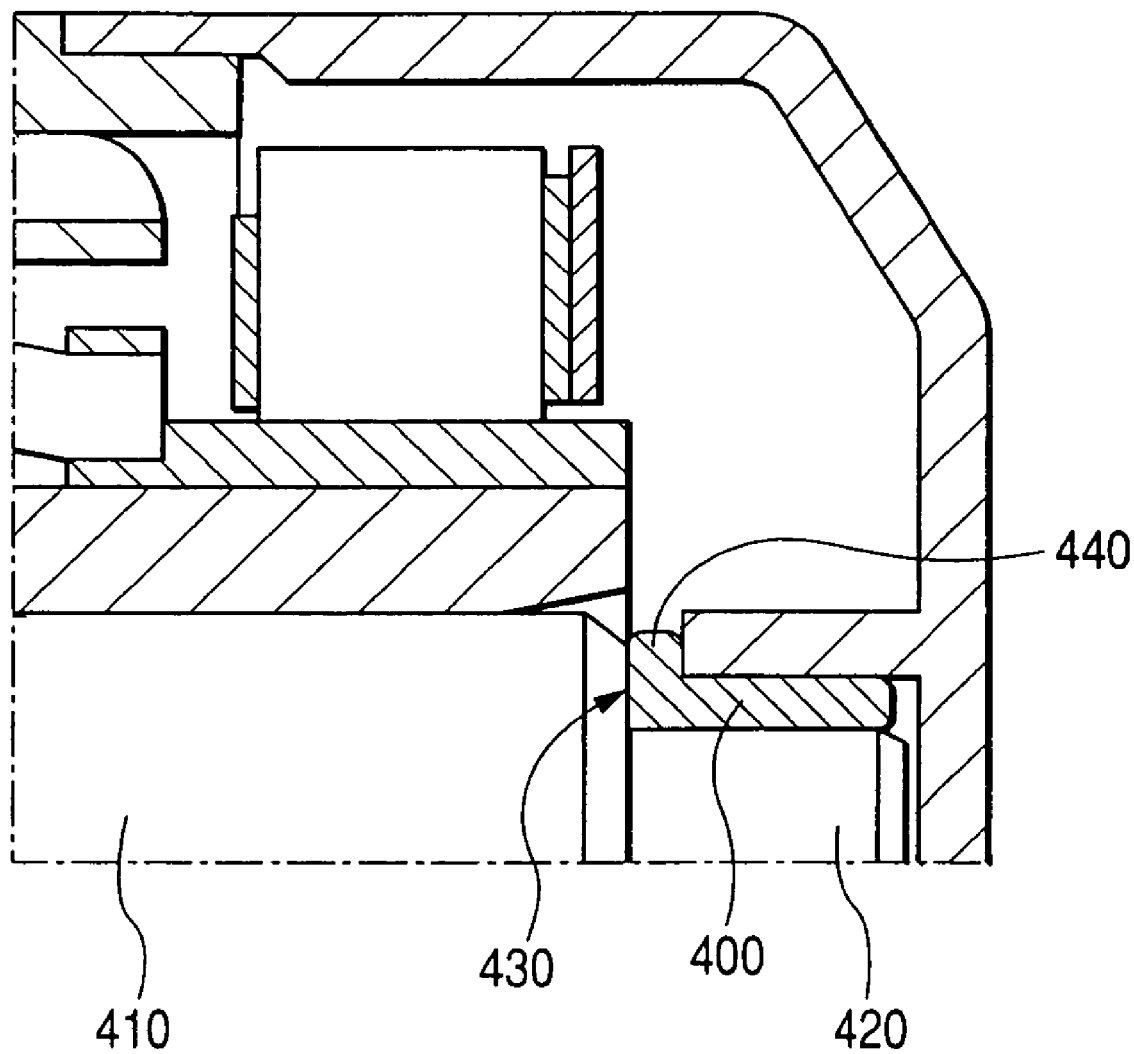
FIG. 19 is a partial sectional view which shows an internal structure of a prior art starter.

FIG. 18 shows the starter motor 2 according to the eighth embodiment of the invention which is a modification of the one in the sixth embodiment, as illustrated in FIG. 13.

A ball bearing 170 is installed in the bearing mount 17a to bear the end 112a of the armature shaft 12 to be rotatable. The ball bearing 170 includes an inner ring 170a and an outer ring 170b. The inner ring 170a is press-fit on the periphery of the end 112a of the armature shaft 12. The outer ring 170b is press-fit on the inner periphery of the bearing mount 17a. Specifically, the inner and outer rings 170a and 170b serve as a stopper to stop the armature 11 from moving in the axial direction thereof.

Use of the ball bearing 170 as the stopper eliminates the need for the end 112a of the armature shaft 12 to protrude outside the end frame 66, thus resulting in no need for forming a hole in the end frame 66. This structure is, therefore, desirable in terms of water and dust proofing.

In the sixth embodiment, each of the brush retaining mechanisms is so designed as to secure the gap A between the surface of the brush 25 and the holder wall 160a when the armature 11 is placed in the position farthest from the end frame 66, but however, the gap A may be eliminated. Specifically, the brush holders 160 may alternatively be so designed that the brush 25 touches the holder wall 160a when the armature 11 is moved away from the end frame 66 due to the vibrations of the engine. The degree of the touch may be controlled by the location of the washer 312 on the end 112b of the armature shaft 12 to minimize the physical impact on the brush holder 160 arising from the touch.

Similarly, in the seventh embodiment, each of the brush retaining mechanisms may alternatively be so designed that each of the brushes 25 touches the holder wall 160b and the holder plate 150 during the vibrations of the brush 25. The degree of the touches may be controlled by the locations of the washer 312 on the end 112b of the armature shaft 12 and the shoulder 112b on the armature shaft 12.

The electric motors 2 in each of the above embodiments is discussed as being installed in the engine starter 1, but may be employed in any other various machines.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An electric rotary machine comprising:
an armature working to produce torque;
a commutator disposed on said armature, said commutator having a commutator surface;
brushes riding on the commutator surface in electrical contact therewith, said brushes sliding on the commutator surface during rotation of said armature;
a plurality of protrusions extending on the commutator surface in a circumferential direction of the commutator surface in which said brushes slide on the commutator surface, said protrusions being arrayed substantially in a widthwise direction of the commutator surface perpendicular to the circumferential direction;
urging mechanisms each of which works to urge a surface of one of said brushes into constant engagement with said protrusions to establish the electrical contacts between the brushes and the commutator surface; and
flat areas formed on end portions of the commutator surface which are opposed to each other in the widthwise direction, the flat areas being unoccupied by said protrusions,
wherein a surface of each of the brushes, which rides on the commutator surface, has flat areas which slide on the flat areas of the commutator, respectively wherein each of said brushes has a bending strength of 16 MPa or more, as determined based on a bending strength of a test piece calculated according to an equation of $8 \times P \times L/(2 \times A \times B^2)$ where L is a distance (cm) between supports on which the test piece is placed, A is a width (cm) of the test piece, B is a thickness (cm) of the test piece, and P is a maximum load (N) when the test piece is broken, wherein each of said brushes is made up of a stack of layers, and wherein the bending strength of said brush is an average of bending strengths of the layers.

2. An electric rotary machine as set forth in claim 1, wherein a range in which said protrusions are arrayed in the widthwise direction of the commutator surface is smaller than a width of each of said brushes, as defined in the widthwise direction of the commutator surface.

3. An electric rotary machine as set forth in claim 2, wherein the range in which said protrusions are arrayed lies within a range, where said brushes slide on the commutator surface, in the widthwise direction of the commutator surface.

4. An electric rotary machine as set forth in claim 1, wherein said commutator is disposed around a circumference of an armature shaft in the form of a cylinder whose peripheral surface serves as the commutator surface.

5. An electric rotary machine as set forth in claim 4, wherein the end portions of the commutator surface are opposed to each other in an axial direction of the commutator, and wherein the other of the end portions of the commutator surface has a joint between the commutator and an armature coil.

6. An electric rotary machine as set forth in claim 1, wherein the commutator surface expands in a radius direction of an armature shaft of said commutator.

7. An electric rotary machine as set forth in claim 6, wherein the end portions of the commutator surface are opposed to each other in the radius direction of the armature shaft of said commutator.

8. An electric rotary machine as set forth in claim 1, wherein the electric rotary machine is designed to start an internal combustion engine.

* * * * *